United States Patent
Green et al.

(10) Patent No.: US 11,185,006 B2
(45) Date of Patent: Nov. 30, 2021

(54) SYSTEM AND A METHOD FOR DETERMINING A TRAJECTORY TO BE FOLLOWED BY AN AGRICULTURAL WORK VEHICLE

(71) Applicant: Agro Intelligence APS, Aarhus N (DK)

(72) Inventors: Ole Green, Lem (DK); Gareth Thomas Charles Edwards, Aarhus C (DK)

(73) Assignee: Agro Intelligence APS, Aarhus N (DK)

( * ) Notice: Subject to any disclaimer, the term of this patent is extended or adjusted under 35 U.S.C. 154(b) by 189 days.

(21) Appl. No.: 16/338,119

(22) PCT Filed: Sep. 29, 2017

(86) PCT No.: PCT/DK2017/050321
§ 371 (c)(1),
(2) Date: Mar. 29, 2019

(87) PCT Pub. No.: WO2018/059646
PCT Pub. Date: Apr. 5, 2018

(65) Prior Publication Data
US 2019/0239416 A1    Aug. 8, 2019

(30) Foreign Application Priority Data

Sep. 29, 2016   (DK) .............................. PA201600572

(51) Int. Cl.
*A01B 79/00*     (2006.01)
*A01B 69/00*     (2006.01)
(Continued)

(52) U.S. Cl.
CPC .......... *A01B 79/005* (2013.01); *A01B 69/007* (2013.01); *A01B 69/008* (2013.01);
(Continued)

(58) Field of Classification Search
CPC ... A01B 79/005; A01B 69/007; A01B 69/008; G01C 21/20; G05D 1/0219; G05D 2201/0201
See application file for complete search history.

(56) References Cited

U.S. PATENT DOCUMENTS

2004/0193348 A1*   9/2004   Gray .................... G05D 1/0219
                                                                 701/50
2005/0197757 A1    9/2005   Flann et al.
(Continued)

FOREIGN PATENT DOCUMENTS

EP         1522823 A1    5/2005
EP         2957159 A1    12/2015

OTHER PUBLICATIONS

Danish Search Report for Danish Application No. PA201600572, dated Jun. 9, 2017, 4 pages.
(Continued)

*Primary Examiner* — Michael J Zanelli
(74) *Attorney, Agent, or Firm* — TraskBritt

(57) ABSTRACT

A support system for determining a trajectory to be followed by an agricultural work vehicle when working a field comprises: a mapping unit configured for receiving: i) coordinates relating to the boundaries of a field to be worked; and ii) coordinates relating to the boundaries of one or more obstacles to be avoided the work vehicle; wherein the one or more obstacles being located within the field; a capacity parameter unit configured for receiving one or more capacity parameters relating to the working vehicle; a trajectory calculating unit configured for calculating an optimized trajectory to be followed by the work vehicle; wherein the optimized trajectory is being calculated on the basis of the coordinates received by the mapping unit; and
(Continued)

one or more of the one or more capacity parameters received by the capacity parameter unit.

19 Claims, 29 Drawing Sheets

(51) Int. Cl.
*A01B 69/04* (2006.01)
*G01C 21/20* (2006.01)
*G05D 1/02* (2020.01)

(52) U.S. Cl.
CPC .......... *G01C 21/20* (2013.01); *G05D 1/0219* (2013.01); *G05D 2201/0201* (2013.01)

(56) References Cited

U.S. PATENT DOCUMENTS

| | | | |
|---|---|---|---|
| 2008/0195270 A1 | 8/2008 | Diekhans et al. | |
| 2009/0240430 A1* | 9/2009 | Sachs | A01B 79/005 701/408 |
| 2012/0101725 A1* | 4/2012 | Kondekar | A01B 69/00 701/445 |
| 2014/0081568 A1* | 3/2014 | Pieper | A01B 69/008 701/400 |
| 2016/0057920 A1* | 3/2016 | Spiller | G01C 21/00 701/23 |
| 2016/0146611 A1 | 5/2016 | Matthews | |
| 2017/0144702 A1* | 5/2017 | Dang | B62D 6/001 |
| 2017/0192431 A1* | 7/2017 | Foster | G05D 1/0088 |
| 2019/0208695 A1* | 7/2019 | Graf Plessen | G01C 21/20 |

OTHER PUBLICATIONS

Hameed et al., An optimized field coverage planning approach for navigation of agricultural robots in fields involving obstacle areas, International Journal of Advanced Robotic Systems, May 6, 2013, pp. 1-9, vol./Bind 10: nr 231, http://journals.sagepub.com/doi/full/10.5772/56248.

Zhou, K., Simulation modelling for in-field planning of sequential machinery operations in cropping systems, PhD, Doctoral dissertation, Aarhus Universitet, Science and TechnologyScience and Technology, 2015, Chapter 1, 3-4, 160 pages.

International Preliminary Reporton Patentability from International Application No. PCT/DK2017/050321, dated Sep. 6, 2018, 14 pages.

International Search Report from International Application No. PCT/DK2017/050321, dated Dec. 22, 2019, 4 pages.

International Written Opinion from International Application No. PCT/DK2017/050321, dated Dec. 22, 2019, 9 pages.

* cited by examiner

SYSTEM AND A METHOD FOR DETERMINING A TRAJECTORY TO BE FOLLOWED BY AN AGRICULTURAL WORK VEHICLE

CROSS-REFERENCE TO RELATED APPLICATIONS

This application is a national phase entry under 35 U.S.C. § 371 of International Patent Application PCT/DK2017/050321, filed Sep. 29, 2017, designating the United States of America and published in English as International Patent Publication WO 2018/059646 A1 on Apr. 5, 2018, which claims the benefit under Article 8 of the Patent Cooperation Treaty to Danish Patent Application Serial No. PA 201600572, filed Sep. 29, 2016, the disclosure of each of which is hereby incorporated herein in its entirety by this reference.

TECHNICAL FIELD

The present disclosure generally relates to the field of optimizing work trajectories of agricultural working vehicles for working a field.

More specifically, the present disclosure relates in a first aspect to a support system for determining a trajectory to be followed by an agricultural work vehicle when working a field.

In a second aspect, the present disclosure relates to a method for optimizing a trajectory to be followed by a work vehicle when working a field.

In a third aspect, the present disclosure relates to a computer program product that is adapted to perform the method according to the second aspect of the present disclosure.

In a fourth aspect, the present disclosure relates to an agricultural work vehicle comprising a support system according to the first aspect of the present disclosure.

In a fifth aspect, the present disclosure relates to a use of a support system according to the first aspect of the present disclosure, or of a computer program product according to the third aspect of the present disclosure, or of an agricultural work vehicle according to the fourth aspect of the present disclosure.

BACKGROUND

Within the specific field of agriculture relating to growing crops, it has been known for thousands of years that in order to optimize crop yield the field has to be proper prepared and maintained. Accordingly, the field in which the crops are grown have to be prepared for seeding, then seeds have to be sown. During growth of the crops, the field has to be fertilized and weeded and finally, when the crops have ripened, the crops are harvested.

All these preparation and maintenance operations, including harvesting will in a modern farming typically be performed using a motorized agricultural working vehicle, such as a tractor carrying or towing an implement, or the agricultural working vehicle may be self-propelled, such as it is know from harvesting machines.

Many fields used for growing crops are not free of obstacles. Accordingly, many fields used for growing crops will include a number of obstacles, such as creeks, ponds, clusters of trees, small hillocks, high voltage masts, electrical substations, wind turbines etc.

When working such fields comprising a number of obstacles these obstacles obviously have to be avoided by the working vehicle.

Most farmers when working a field comprising a number of obstacles simply follow a path based on habits. That is when working a field comprising a number of obstacles most farmers just follow the path that they use to follow when working that specific field, not paying particular attention to the question whether a more efficient path exist.

Furthermore, as various types of working implement for working a field will typically have different efficient working widths or other working parameters, it may not be the case that an optimum working path in respect of one working implement will be optimum in respect of another implement involving different working parameters.

Some agricultural working implement gain weight during operation, whereas others lose weight during operation thereof. Harvesters belong to the first category. Sowing machines and fertilizers belong to the second category.

As weight of the working vehicle, as a function of path travelled, may influence the immediate efficiency of the implement, also an optimized working trajectory may be dependent on the weight at a given position of the field. Accordingly, in order to optimize a working trajectory of an agricultural working implement, it may be necessary to take into consideration, the weight of the working implement at a given position on the trajectory.

When working farm land in a non-optimized way in which the trajectory that is followed is not an optimum trajectory, excessive time consumption in the working operation, excessive fuel consumption, excessive areas of the field covered more than once, and excessive wear on the working implement or machinery, or excessive travelling through the crops may result.

Accordingly there is a persistent need for improving efficiency when working an agricultural field using a working vehicle.

BRIEF SUMMARY

It is an objective of the present disclosure to provide systems, uses and methods for improving efficiency when working an agricultural field using a working vehicle. Specifically, it is an objective of the present disclosure to provide systems, uses and methods for determining an optimized trajectory to be followed by an agricultural work vehicle, when working an agricultural field.

This objective is achieved by the present disclosure in its first, second, third, fourth and fifth embodiments, respectively.

Accordingly, in a first aspect, the present disclosure relates to a support system for determining a trajectory to be followed by an agricultural work vehicle, when working a field, the system comprising:

a mapping unit configured for receiving:
  i) coordinates relating to the boundaries of a field to be worked; and
  ii) coordinates relating to the boundaries of one or more obstacles to be avoided by the work vehicle; wherein the one or more obstacles being located within the field;

a capacity parameter unit configured for receiving one or more capacity parameters relating to the working vehicle;

a trajectory calculating unit configured for calculating an optimized trajectory to be followed by the work vehicle; wherein the optimized trajectory is being calculated on the basis of the coordinates received by the mapping unit; and one or more of the one or more capacity parameters received by the capacity parameter unit.

In a second aspect, the present disclosure relates to a method for determining a trajectory to be followed by an agricultural work vehicle, when working a field, the method comprising the steps:
a) providing information relating to:
i) coordinates relating to the boundaries of a field to be worked; and
ii) coordinates relating to the boundaries of one or more obstacles to be avoided by the work vehicle; wherein the one or more obstacles being located within the field;
b) providing information relating to:
one or more capacity parameters relating to the working vehicle;
c) performing a calculation of an optimized trajectory to be followed by the work vehicle; wherein the optimized trajectory is being calculated on the basis of the coordinates provided in steps a) and b).

In a third aspect, the present disclosure relates to a computer program product that, when loaded or operating on a computer, is adapted to perform the method according to the second aspect.

In a fourth aspect, the present disclosure relates to an agricultural work vehicle comprising a support system according to the first aspect.

In a fifth aspect, the present disclosure relates to the use of a support system according to the first aspect of the present disclosure or of a computer program product according to the third aspect of the present disclosure or of an agricultural work vehicle according to the fourth aspect of the present disclosure for optimizing a trajectory to be followed by a work vehicle when working a field.

The present disclosure in its various aspects provides for optimizing a path to be followed by a working vehicle or a working implement upon working a field. Thereby a high working efficiency is obtained. The efficiency may relate to saving time, saving fuel, saving wear and tear of the machinery employed, minimizing total distance travelled twice or more, minimizing total area covered twice etc.

DETAILED DESCRIPTION

Figure 1:
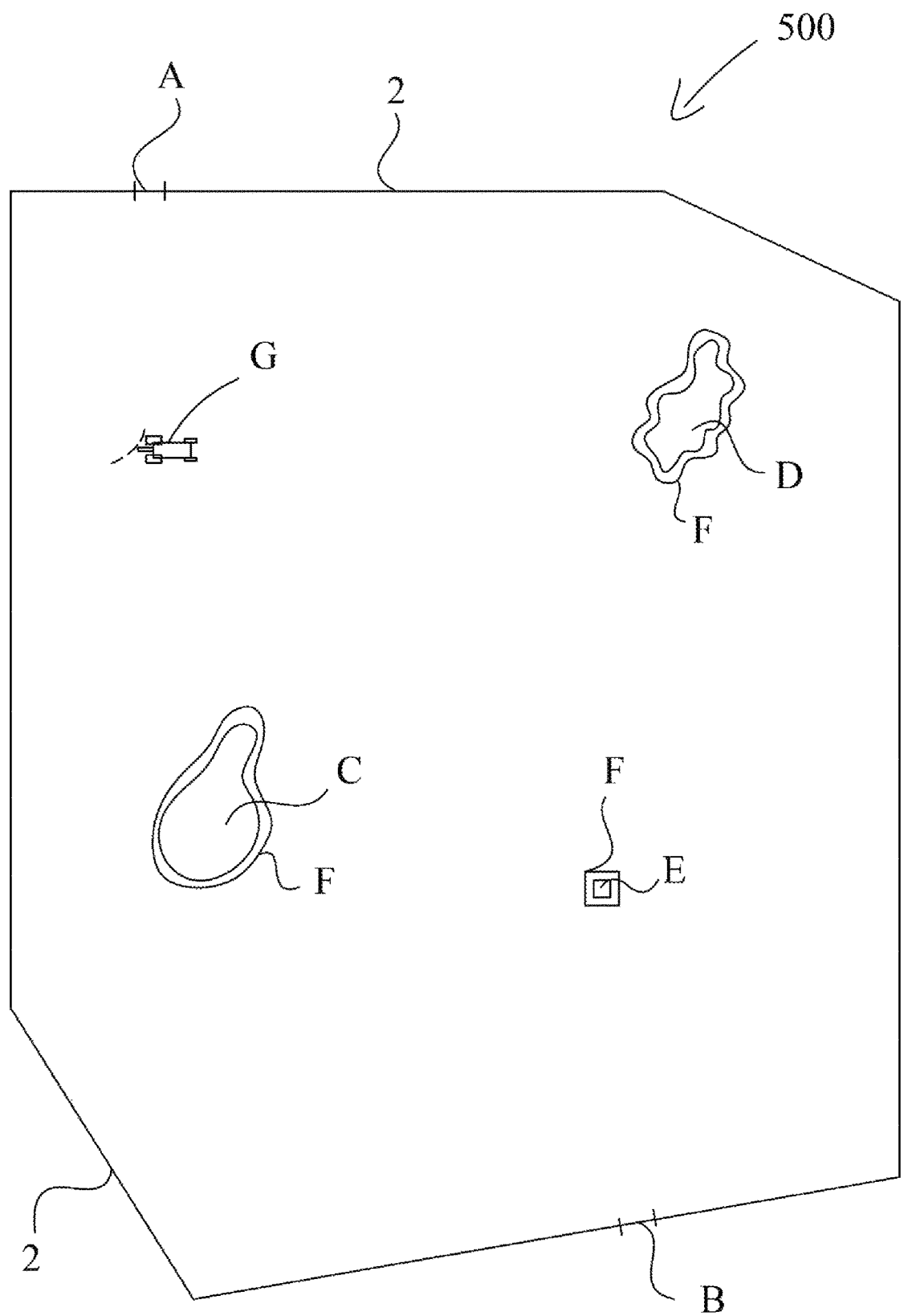
FIG. 1 is a top view of a field comprising a number of obstacles located within its boundary and illustrates the problems associated with working such a field.

In a first aspect, the present disclosure relates to a support system for determining a trajectory to be followed by an agricultural work vehicle, when working a field, the system comprising:

a mapping unit configured for receiving:
i) coordinates relating to the boundaries of a field to be worked; and
ii) coordinates relating to the boundaries of one or more obstacles to be avoided by the work vehicle; wherein the one or more obstacles being located within the field;
a capacity parameter unit configured for receiving one or more capacity parameters relating to the working vehicle;
a trajectory calculating unit configured for calculating an optimized trajectory to be followed by the work vehicle; wherein the optimized trajectory is being calculated on the basis of the coordinates received by the mapping unit; and one or more of the one or more capacity parameters received by the capacity parameter unit.

The support system is designed with the view to aid in optimizing finding a trajectory to be followed upon working an agricultural field with a working vehicle or implement.

The support system may be in the form of electronic equipment configured for receiving inputs relating to coordinates of the field and obstacles therein. The support system is further configured to using these inputted inputs to determine an optimized trajectory to be followed. The support system typically makes use of a computer for performing calculations, such as iterative calculations.

The various units may independently be connected to each other, or at least be able to communicate with each other. The support system may comprise separate entities or be integrated.

In one embodiment of the first aspect of the present disclosure, the mapping unit is furthermore is configured for receiving:
iii) coordinates relating to the possible entrance/exit gates of the field.

This ensures that the position or positions of entrance/exit gates are taking into consideration when calculating the optimized trajectory to be followed.

In one embodiment of the first aspect of the present disclosure, the optimized trajectory is being an optimized trajectory in terms of total operational time for working the field; total productive time for working the field; total fuel consumption for working the field; total non-working distance for working the field; total distance travelled twice or more; total distance travelled through crops; total area covered twice or more.

Depending on which concern after which the trajectory is to be optimized, a number of different optimizations parameters are possible. Above, a few of these are listed.

In one embodiment of the first aspect of the present disclosure, the one or more capacity parameters being selected from the group comprises: effective working width of the work vehicle or the working implement, load of work vehicle as a function of distance travelled, fuel consumption as a function of distance travelled, and minimum turning radius of vehicle or implement or both.

These parameters are parameters that may be relevant in finding an optimized trajectory to follow when working a field.

In one embodiment of the first aspect of the present disclosure, the support system further comprising a display unit configured to be able to show on a map of the filed, the optimized trajectory to be followed by the work vehicle as calculated by the trajectory calculating unit.

This will enable the driver of the working vehicle or implement to easily follow the optimized trajectory, once this has been provided by the trajectory calculating unit.

In one embodiment of the first aspect of the present disclosure, the mapping unit is being configured for storing, in respect of one or more specific fields, one or more of: i) coordinates relating to the boundaries of the one or more specific fields; ii) coordinates relating to the boundaries of one or more obstacles located within the one or more specific fields; and iii) coordinates relating to the possible entrance/exit gates of the one or more specific fields.

This will allow minimizing the amount of input needed from time to time.

In one embodiment of the first aspect of the present disclosure, the trajectory calculating unit is configured to calculate an optimized trajectory analytically or numerically.

Analytically or numerically calculation strategies are two strategies that are particularly well suited in respect of the present disclosure.

In one embodiment of the first aspect of the present disclosure, the trajectory calculating unit is being configured to find a number of candidate trajectories, and wherein the trajectory calculating unit is configured to calculate, in respect of each candidate trajectory, an efficiency parameter, and wherein the trajectory calculating unit is configured to suggest to the user, that specific candidate trajectory that exhibits the highest efficiency parameter.

Such a mode of operation of the support system is particularly preferred.

In one embodiment of the first aspect of the present disclosure, the trajectory calculating unit is being configured to perform the following steps:
  a) approximating the coordinates relating to the boundaries of the field to be worked to a boundary polygon; and wherein the support system is being configured to determine the trajectory to be followed, based on that approximation;
  b) approximating the coordinates relating to the boundaries of each of the one or more obstacles, to respective obstacle polygons; and wherein the support system is being configured to determine the trajectory to be followed, based on that approximation;
  c) defining one or more headlands located immediately within the boundary polygon;
  d) in respect of each obstacle polygon, defining one or more headlands surrounding the obstacle polygon;
  e) defining a work area that corresponds to the area within the boundary polygon with the exclusion of the area corresponding to any headlands and with the exclusion of the area corresponding to any obstacle polygon;
  f) in respect of the orientation of one or more sides of headlands, define an array of parallel working rows located within the work area;
  g) in respect of one or more arrays of parallel working rows defined in step f), define an array of possible continuous driving paths by connecting separate entities, wherein the separate entities is being either headlands, or parts of a headland, and working rows, or parts of a working row; so as to define possible continuous driving paths, wherein each driving path is covering all headlands and all working rows;
  h) in respect of each of more possible continuous driving paths defined in step g), calculate an associated cost parameter, the calculated cost parameter being representative of the efficiency by following that specific continuous driving path;
  i) select as the trajectory to be followed, that specific continuous driving path exhibiting the highest efficiency.

Hereby it is possible in a clever and well-organized way to allow the trajectory calculating unit to find an optimized trajectory to be followed.

In one embodiment of the first aspect of the present disclosure, the trajectory calculating unit is being configured to create a possible continuous path by first choosing a particular entrance/exit gate.

As the entrance/exit gate(s) is/are fixed constraint(s) it has proven beneficial to operate the system this way.

In one embodiment of the first aspect of the present disclosure, the headland surrounding the obstacle polygon in respect of one or more of the obstacle polygons, includes a safety offset area surrounding the obstacle polygon.

Including a safety offset area surrounding the obstacle polygon will enhance safety when operating the work vehicle or implement as collision hazards will be reduced this way.

In one embodiment of the first aspect of the present disclosure, each working row and/or each headland independently are having a width corresponding to the effective working width of the work vehicle or working implement.

It is beneficial to create working paths having widths corresponding to the effective working width of the work vehicle or working implement.

In one embodiment of the first aspect of the present disclosure, the support system being configured for defining a number of possible continuous driven paths, each comprising a sequence of straight line segments and arched line segments.

Hereby it will be possible for the driver of the work vehicle or implement to follow one continuous path.

In one embodiment of the first aspect of the present disclosure, the support system is being configured to find the optimized trajectory by means of a heuristic method, such as a greedy heuristic method, a tabu search solver, an ant colony solver, a genetic algorithm.

Such heuristic method will reduce the amount of data processing necessary for the trajectory calculating unit.

In one embodiment of the first aspect of the present disclosure, the support system is being configured to create a number N of possible continuous driven paths with an associated assigned cost parameter, and wherein the number N being an integer in the range 1,000-700,000 or more, for example, 2,000-600,000, such as 5,000-500,000, e.g., 10,000-400,000, such as 50,000-300,000 or 100,000-200,000 possible continuous driven paths with an associated assigned cost parameter.

Such numbers of choices to choose from will enhance the reliability of the trajectory found by the system.

In a second aspect, the present disclosure relates to a method for determining a trajectory to be followed by an agricultural work vehicle, when working a field, the method comprising the steps:
  a) providing information relating to:
    i) coordinates relating to the boundaries of a field to be worked; and
    ii) coordinates relating to the boundaries of one or more obstacles to be avoided by the work vehicle; wherein the one or more obstacles are located within the field;
  b) providing information relating to:
    one or more capacity parameters relating to the working vehicle;
  c) performing a calculation of an optimized trajectory to be followed by the work vehicle; wherein the optimized trajectory is being calculated on the basis of the coordinates provided in steps a) and b).

In one embodiment of the second aspect of the present disclosure, step a) furthermore involves providing:

iii) coordinates relating to the possible entrance/exit gates of the field.

This ensures that the position or positions of entrance/exit gates are taking into consideration when calculating the optimized trajectory to be followed.

In one embodiment of the second aspect of the present disclosure, the optimized trajectory is an optimized trajectory in terms of total operational time for working the field; total productive time for working the field; total fuel consumption for working the field; total non-working distance for working the field; total distance travelled twice or more; total distance travelled through crops; total area covered twice or more.

Depending on which concern after which the trajectory is to be optimized, a number of different optimizations parameters are possible. Above, a few of these are listed.

In one embodiment of the second aspect of the present disclosure, one or more capacity parameters being selected from the group comprises: effective working width of the work vehicle or the working implement, load of work vehicle as a function of distance travelled, fuel consumption as a function of distance travelled, and minimum turning radius of vehicle or implement or both.

These parameters are parameters that may be relevant in finding an optimized trajectory to follow when working a field.

In one embodiment of the second aspect of the present disclosure, the optimized trajectory to be followed by the work vehicle is being presented in a graphical presentation such as being shown on an electronic map of the field to be worked.

This will enable the driver of the working vehicle or implement to easily follow the optimized trajectory, once this has been provided by the trajectory calculating unit.

In one embodiment of the second aspect of the present disclosure, the method involves calculation of the optimized trajectory analytically or numerically.

Analytically or numerically calculation strategies are two strategies that are particularly well suited in respect of the present disclosure.

In one embodiment of the second aspect of the present disclosure, the method involves finding a number of candidate trajectories; calculation in respect of each candidate trajectory, an efficiency parameter; and suggesting to a user, that specific candidate trajectory, which exhibits the highest efficiency parameter.

Such a mode of operation of the method is particularly preferred.

In one embodiment of the second aspect of the present disclosure, the method involves performing the following steps:

a) approximating the coordinates relating to the boundaries of the field to be worked to a boundary polygon;
b) approximating the coordinates relating to the boundaries of each of the one or more obstacles, to respective obstacle polygons;
c) defining one or more headlands located immediately within the boundary polygon;
d) in respect of each obstacle polygon, defining one or more headlands surrounding the obstacle polygon;
e) defining a work area that corresponds to the area within the boundary polygon with the exclusion of the area corresponding to any headlands and with the exclusion of the area corresponding to any obstacle polygon;
f) in respect of the orientation of one or more sides of headlands, define an array of parallel working rows located within the work area;
g) in respect of one or more arrays of parallel working rows defined in step f), define an array of possible continuous driving paths by connecting separate entities, wherein the separate entities is being either headlands, or parts of a headland, and working rows, or parts of a working row; so as to define possible continuous driving paths wherein each driving path is covering all headlands and all working rows;
h) in respect of each of more possible continuous driving paths defined in step g), calculate an associated cost parameter, the calculated cost parameter being representative of the efficiency by following that specific continuous driving path;
i) select as the trajectory to be followed, that specific continuous driving path exhibiting the highest efficiency.

Hereby it is possible in a clever and well-organized way to calculate and find an optimized trajectory to be followed.

In one embodiment of the second aspect of the present disclosure, the method involves creation of a possible continuous path by first choosing a particular entrance/exit gate.

As the entrance/exit gate(s) is/are fixed constraint it has proven beneficial to operate the method this way.

In one embodiment of the second aspect of the present disclosure, the headland surrounding the obstacle polygon, in respect of one or more of the obstacle polygons, includes a safety offset area surrounding the obstacle polygon.

Including a safety offset area surrounding the obstacle polygon will enhance safety when operating the work vehicle or implement as collision hazards will be reduced this way.

In one embodiment of the second aspect of the present disclosure, each working row and/or each headland independently are having a width corresponding to the effective working width of the work vehicle or working implement.

It is beneficial to create working paths having widths corresponding to the effective working width of the work vehicle or working implement.

In one embodiment of the second aspect of the present disclosure, the method involves defining a number of possible continuous driven paths, each comprising a sequence of straight line segments and arched line segments.

In one embodiment of the second aspect of the present disclosure, the method involves finding the optimized trajectory by means of a heuristic method, such as a greedy heuristic method, a tabu search solver, an ant colony solver, a genetic algorithm.

Such heuristic method will reduce the amount of data processing necessary involved in the method.

In one embodiment of the second aspect of the present disclosure, the method involves creating a number N of possible continuous driven paths with an associated assigned cost parameter, and wherein the number N being an integer in the range 1,000-700,000, possible continuous driven paths with an associated assigned cost parameter, such as 5,000-500,000, e.g., 10,000-400,000, such as 50,000-300,000 or 100,000-200,000 possible continuous driven paths with an associated assigned cost parameter.

Such numbers of choices to choose from will enhance the reliability of the trajectory found in the method.

In one embodiment of the second aspect of the present disclosure, the method being performed by using a support system according to the first aspect of the present disclosure.

In a third aspect, the present disclosure relates to a computer program product that, when loaded or operating on a computer, being adapted to perform the method according to the second aspect of the present disclosure.

In the present description and in the appended claims it shall be understood that a computer program product may be presented in the form of a piece of software that is storable or stored on a piece of hardware. Hereby, the computer program product may be embodied in one or more computer readable storage media as a computer readable program code embodied thereon.

Accordingly, the computer program product may be presented as a computer-readable storage medium having a computer program product embodied therein.

The computer program code is configured for carrying out the operations of the method according to the first aspect of the present disclosure, and it may be written in any combination of one or more programming languages.

In a fourth aspect, the present disclosure relates to an agricultural work vehicle comprising a support system according to the first aspect of the present disclosure.

In a fifth aspect, the present disclosure relates to the use of a support system according to the first aspect of the present disclosure, or of a computer program product according to the third aspect of the present disclosure, of an agricultural work vehicle according to the fourth aspect of the present disclosure for optimizing a trajectory to be followed by the work vehicle when working a field.

In the present description and in the appended claims the following definitions shall be adhered to:

Field to be worked: A field to be worked shall be understood to comprise a limited area of a field that the content or surface needs to be subjected to an agricultural activity.

Obstacle: An obstacle shall be understood to comprise a physical entity that is located within or that has an extension that extends into a field to be worked and that its presence prevents working the field at the location of that obstacle.

Boundary polygon: A boundary polygon shall be understood to be a polygon that has a size and a shape that approximates the boundary of a field to be worked.

Obstacle polygon: An obstacle polygon shall be understood to be a polygon that has a size and a shape that approximates the boundary of an obstacle.

Headland: A headland shall be understood to be an area located immediately within the boundary of a field to be worked, or within a boundary polygon, or that surrounds an obstacle in close proximity thereof.

Mainland: A mainland shall be understood to be an area located within a field boundary or within a boundary polygon, excluding any area corresponding to headlands.

Safety offset area: A safety offset area is an area surrounding an obstacle, or an obstacle polygon, thereby rendering the effective size of an obstacle greater that the obstacle, or obstacle polygon itself. A safety offset area serves the purpose of creating a safety distance from an obstacle to a working vehicle or implement in order to avoid collision with that obstacle.

Work area: A work area shall be understood to mean the area comprised inside the boundary of a field to be worked, or an approximation thereof, and excluding any headland; and excluding any obstacles, or approximation of any obstacles including a safety offset area of one or more obstacles.

Working row: A working row shall be understood to mean a row located within a work area and that preferably is having a width corresponding to the effective working width of the soil working vehicle or implement.

Cost parameter: A cost parameter shall be understood to mean a parameter expressing a relative efficiency in following a specific path.

Optimized trajectory: An optimized trajectory shall be understood to mean that trajectory that when compared to other trajectories under investigation, is most efficient in terms of a cost parameter. An optimized trajectory needs may or may not be a globally optimized trajectory. In some instances an optimized trajectory merely expresses an intelligent and qualified suggestion for a best path to follow when working a field.

Now referring to the figures for the purpose of illustration, FIG. 1 shows an overhead plan view of a field 500 to be worked by an agricultural working vehicle or implement. The field comprises two possible entrances/exits A and B located at the field boundary 2 of the field. Within the field a number of obstacles are present. These obstacles must be avoided when working the field. The obstacles being present in the field 500 shown in FIG. 1 include a pond C, a cluster of trees D and a high voltage mast E. Each of the obstacles is surrounded by a safety margin F. The safety margin serves the purpose of not getting too close to the obstacles when working the field, and is thereby intended for avoiding any hazardous situation relating to impact between the working vehicle and the obstacles.

Also illustrated in FIG. 1 is a working vehicle G in the form of a tractor towing a plow.

It is easily acknowledged that the field 500 with its obstacles C, D and E and its entrances/exits A and B illustrated in FIG. 1 allows for an almost indefinitely number of possible trajectories for working the whole field, and that the human brain is not in itself without any technological aid capable to immediately tell which working path or working trajectory will be most efficient.

Figure 2:
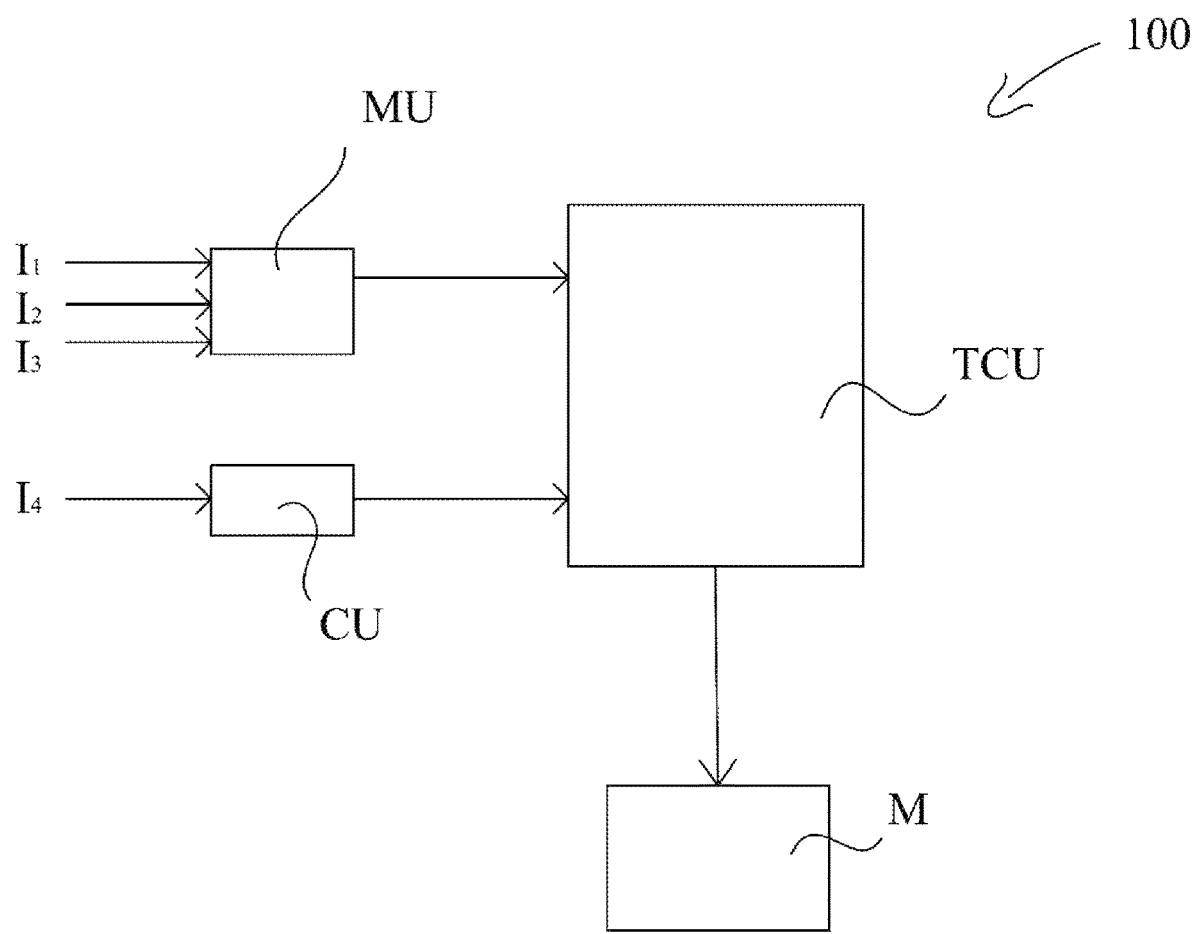
FIG. 2 is a diagrammatic illustration of the working mode of a support system according to the present disclosure.

FIG. 2 is a diagram that illustrates the working mode of one embodiment of the support system for determining a trajectory to be followed by an agricultural work vehicle according to the first aspect of the disclosure.

FIG. 2 shows the support system 100 for determining a trajectory to be followed by an agricultural work vehicle. The support system comprises a mapping unit MU configured for receiving information $I_1$ in the form of coordinates relating to the boundaries of a field to be worked; and information $I_2$ in the form of coordinates relating to the boundaries of one or more obstacles within the field and to be avoided by the work vehicle; and information $I_3$ in the form of coordinates relating to the possible entrance(s)/exit(s) of a specific field to be worked.

The support system further comprises a capacity parameter unit CU configured for receiving information $I_4$ relating to one or more capacity parameters relating to the working vehicle.

The one or more capacity parameters may relate to effective working width of the work vehicle or the working implement, load of work vehicle as a function of distance travelled, fuel consumption as a function of distance travelled, turning radius of the work vehicle, etc.

Based on the information $I_1$, $I_2$ and $I_3$ provided to the mapping unit MU and based on the information $I_4$ provided to the capacity parameter unit CU, a trajectory calculating unit TCU is calculating an optimized trajectory to be followed by the work vehicle. The calculated optimized work trajectory is displayed on the display M that also outlines the field itself.

The calculation may be an analytical calculation or a numerical calculation.

EXAMPLES

The following example illustrates on embodiment of various aspects of the present disclosure.

Example 1

The following example discloses in detail one way of performing the mathematical operations necessary in the process of going from a field boundary to creating possible individual candidate trajectories and the step of assigning an efficiency parameter to each of those candidate trajectories so that the most efficient candidate trajectory can be chosen as the optimum trajectory when working that field with an agricultural working vehicle or implement.

The present example is based on the principle involving the following steps:
  a) approximating the coordinates relating to the boundaries of the field to be worked to a boundary polygon;
  b) approximating the coordinates relating to the boundaries of each of the one or more obstacles, to respective obstacle polygons;
  c) defining one or more headlands located immediately within the boundary polygon;
  d) in respect of each obstacle polygon, defining one or more headlands surrounding the obstacle polygon;
  e) defining a work area that corresponds to the area within the boundary polygon with the exclusion of the area corresponding to any headlands and with the exclusion of the area corresponding to any obstacle polygon;
  f) in respect of the orientation of one or more sides of headlands, define an array of parallel working rows located within the work area;
  g) in respect of one or more arrays of parallel working rows defined in step f), define an array of possible continuous driving paths by connecting separate entities, wherein the separate entities is being either headlands, or parts of a headland, and working rows, or parts of a working row; so as to define possible continuous driving paths, wherein each driving path is covering all headlands and all working rows;
  h) in respect of each of more possible continuous driving paths defined in step g), calculate an associated cost parameter, the calculated cost parameter being representative of the efficiency by following that specific continuous driving path; and
  i) select as the trajectory to be followed, that specific continuous driving path exhibiting the highest efficiency.

Other principles may work equally well with the disclosure in its various aspects.

Figure 3:
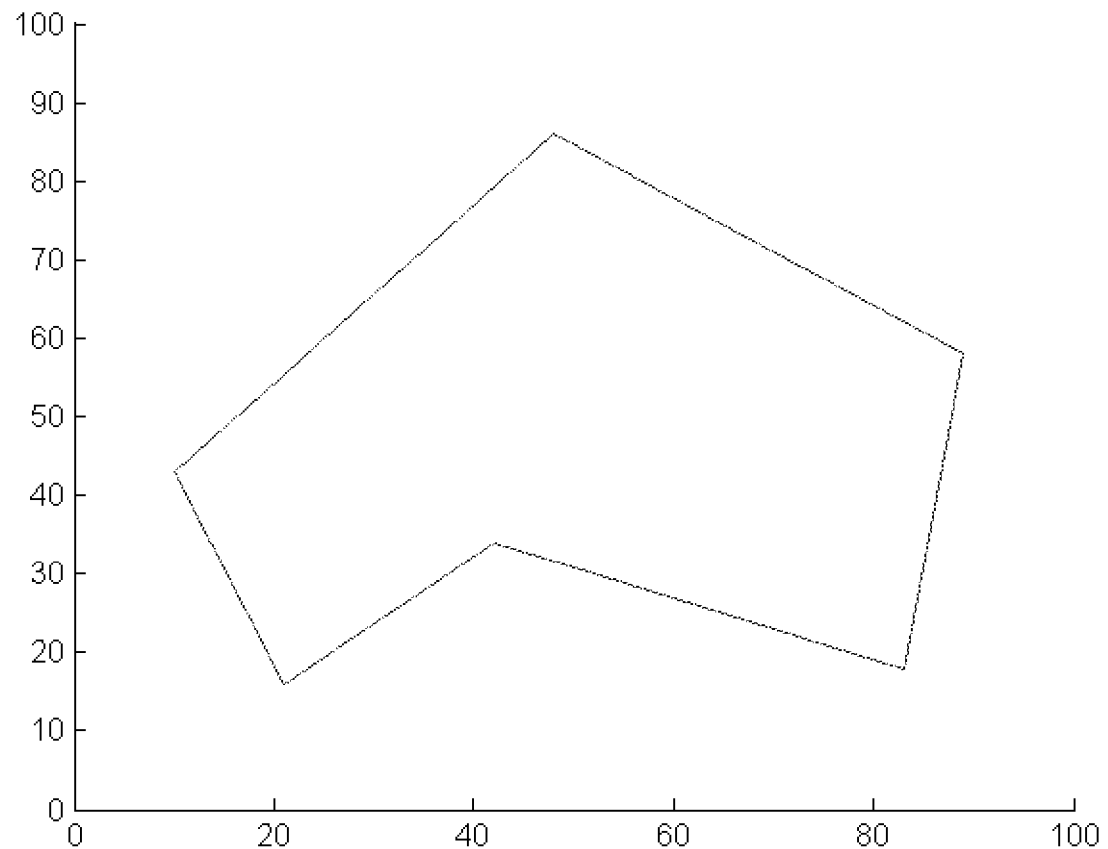
FIGS. 3-23d are illustrations relating to Example 1 illustrates how to mathematically manage to create possible continuous driving paths in an agricultural field and how to find an optimum driving path amongst those possible continuous driving paths.

In the calculation of the present example, the following inputs are needed.
  Defined Field Boundary
  Defined Obstacle Boundary
  Defined Field Gates
  Vehicle working width
  Vehicle turning radius
  Specified number of headlands Processing Steps
  Field Definition
  The field is described by the field boundary, which is a polygon consisting of n points. In FIG. 3 the polygon P consists of 6 point ($P_1, \ldots, P_6$). The points of P are ordered such that they are in a clockwise orientation. P=([10,43], [48,86],[89,58],[83,18],[42,34],[21,16]). See FIG. 3.

Figure 4:
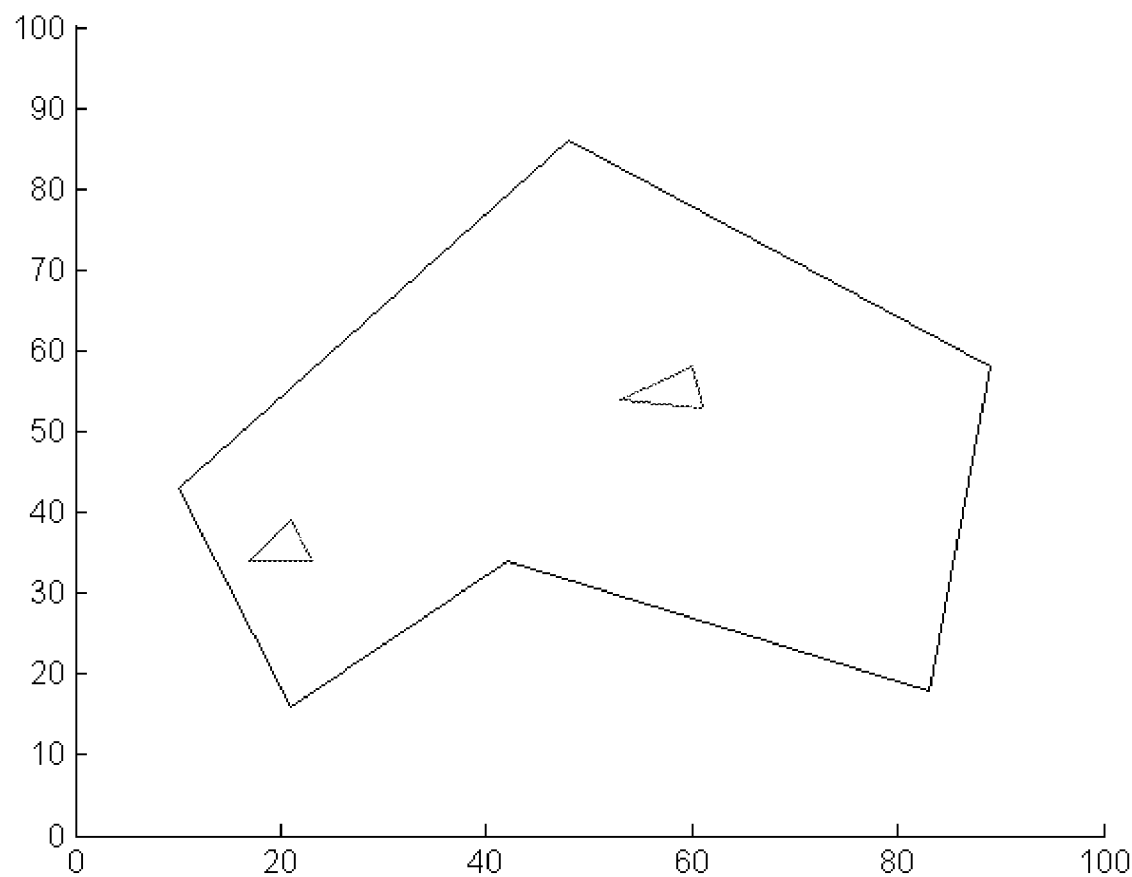

Within the boundary, there are a number of obstacles. The obstacles the obstacles are described by a boundary. This may be the physical edge of the obstacle or it may also include a "safety offset" to ensure working vehicles remain a safe distance away. In FIG. 4 the obstacles are described as polygons ($O^1, O^2$) with points ($O^1_1, \ldots, O^1_3$) and ($O^2_1, \ldots, O^2_3$). The points of the obstacles are ordered such they are in an anti-clockwise orientation. $O^1$=([23,34],[21, 39],[17,34]), and $O^2$=([60,58],[53,54],[61,53]). See FIG. 4.

A number of gates are defined for the field. These are entry/exit point for the field and are located on the field boundary. In this example, there is one gate $G^1$=[83,18].

The working width is the effective working width of the agricultural machine or implement. The turning radius is minimum radius the vehicle can turn. For a standard two axle vehicle with one axle steering it can be calculated by dividing the distance between the front and rear axles of the vehicle by the tangent of the maximum angle of the steering axle.

Creating the Headlands

The headlands are areas that encompass the field boundary and the surround the obstacle. These areas are used by the vehicle to more easily maneuver in the field. The number of headlands required to safely operate in a field is the integer greater than 2*turning radius divided working width. The headlands have an outer boundary and an inner boundary. For the first headland areas the outer boundary is the boundary of the field or the obstacle and the inner boundary plotted such that the area between the outer boundary and inner boundary has a width equal to the working width. For subsequent headlands, the outer boundary is the inner boundary of the previous headland.

To calculate the headland areas the boundary of the field and the boundary of each obstacle are expressed as a set consisting of three arrays {P, V, A}, where P is the array of corner points of the boundary, V is the array of vertices linking the corners of the boundary and A is the array of vectors at the apex of each boundary point.

$$V_i = P_{i+1} - P_i : i = 1 \ldots p-1$$

$$V_p = P_1 - P_p$$

$$\frac{A_i \cdot -V_{i-1}}{|A_i||V_{i-1}|} = \cos\theta = \frac{A_i \cdot V_i}{|A_i||V_i|},$$

$$\frac{A_i \cdot [V_{i,y} \quad -V_{i,x}]}{|A_i||V_i|} < \frac{A_i \cdot [-V_{i,y} \quad V_{i,x}]}{|A_i||V_i|}$$

$$|A_i| = \frac{1}{\sin\theta}$$

Figure 5:
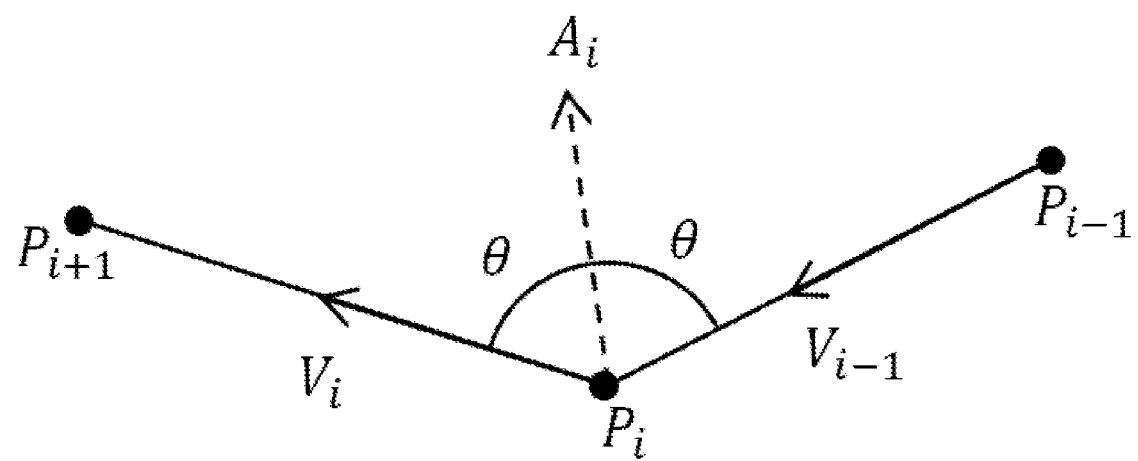

This is illustrated in FIG. 5.

The constrain on $A_i$ ensures that the $A_i$ vector always points to the right of the $V_i$ vector. See FIG. 5.

Figure 6:
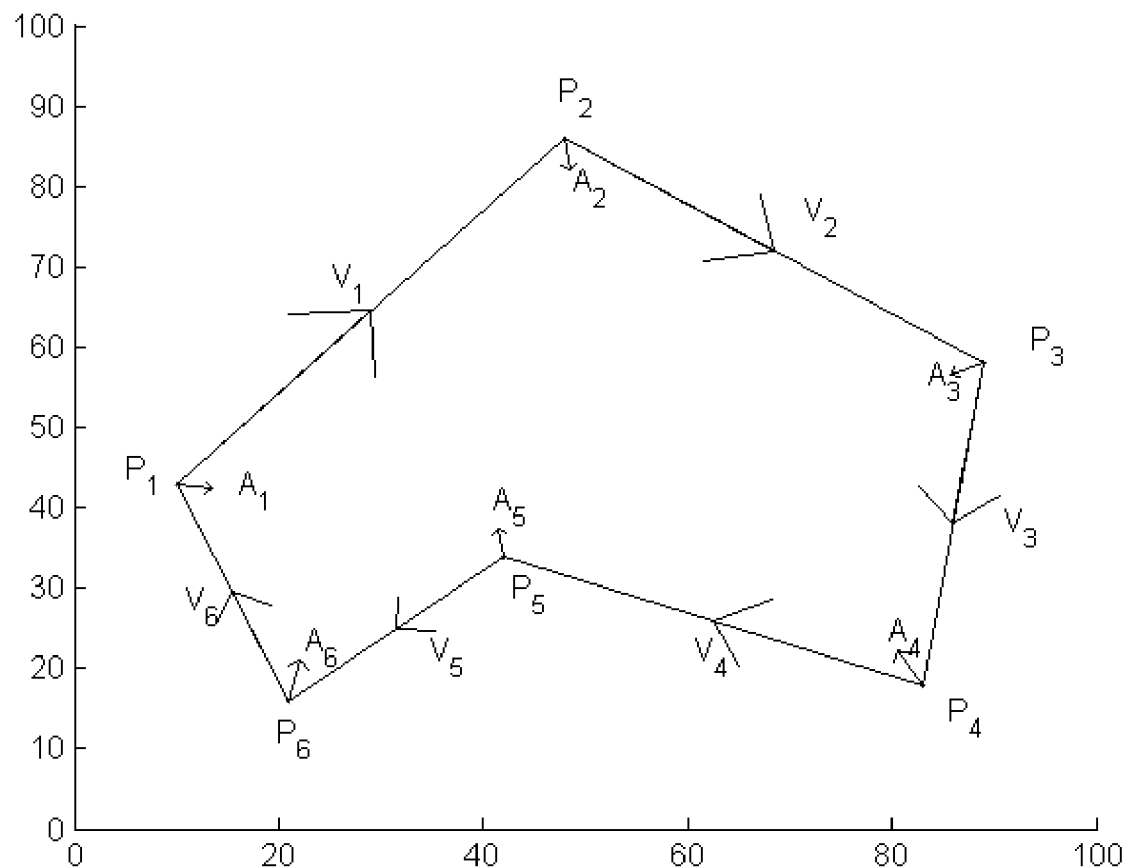

In FIG. 6, the P, V, and A arrays are labelled for the field boundary. In the example for the field boundary, V=([38, 43],[41,−28],[−6,−40],[−41,16],[−21,−18],[−11,27]) and A=([1.16,−0.20],[0.16,−1.32],[−1.08,−0.47],[−0.80,1.39],[−0.2,1.15],[0.40,1.66]).

To create the inner boundary, the corners of the outer boundary are projected along the apex vector, so that they maintain an equal perpendicular distance from the two vectors creating the corner. Therefore, for a distance λ, a new boundary can be created as a new set of point P'.

$$P'_i = P_i + \lambda * A_i; \; i=1,\ldots,p$$

V' and A' can then be created using the above equations.

There are three cases that must be monitored when creating the new boundary. The three cases are a self-corner interception, a self-edge interception and a two-polygon interception.

Case 1:

The self-corner interception occurs when two adjacent apex vectors intersect, resulting in V' to have a zero length and $P_i = P_{i+1}$. Therefore, for each P, there is a value α where this happens.

$$P'_i = P_i + \alpha_i * A_i = P_{i+1} + \alpha_i * A_{i+1} = P'_{i+1}: i = 1 \ldots p-1$$

$$P'_1 = P_1 + \alpha_p * A_1 = P_p + \alpha_p * A_p = P'_p$$

$$\alpha_i = \frac{P_{i+1} - P}{A_i - A_{i+1}} : i = 1 \ldots p-1$$

$$\alpha_p = \frac{P_1 - P_p}{A_p - A_1}$$

$$\alpha_n = \min\{\alpha_i\} : \alpha_i > 0, i = 1 \ldots p$$

If a self-corner interception occurs $P'_i$ is removed from P', and V' and A' are recalculated.

For the example of the field boundary, α=[38.34,36.76, 40.9,36.89,160.54,14.89]. Therefore, $\alpha_n$=14.89. Since O1 and O2 are both triangles with the points arranged in an anti-clockwise orientation, it is impossible for a self-corner interception to occur.

Case 2:

The self-edge interception occurs when an apex vector intersects a vertex between two points.

$$P'_i = P'_j + b * V'_j; \; j=1,\ldots,p; \; i \neq j, \; 0<b<1$$

Therefore, for each pair of point $P_i$ and $P_1$, there is a value $\beta_{ij}$ where this occurs.

$$\beta_{ij} = \frac{P_{j+1} - P_j - P_i}{A_i + A_j - A_{j+1}} : i = 1 \ldots p, j = 1 \ldots p-1, i \neq j, i \neq j+1$$

$$\beta_{ip} = \frac{P_1 - P_p - P_i}{A_i + A_p - A_1} : i = 1 \ldots p-1$$

$$\beta_{nm} = \min\{\min\{\beta_{ij}\}_j\}_i : i = 1 \ldots p, j = 1 \ldots p, \beta_{ij} > 0$$

If a self-edge interaction occurs, then P' is split into two subsets, $^1_\square$P' and $^1_\square$P' and V' and A' are recalculated.

$$P'_i = P_i + \beta_{nm} * A_i; \; i=1 \ldots p$$

$$^1_\square P' = \{P'_1, \ldots, P'_n, P'_{m+1}, \ldots, P'_p\}, ^1_\square P' = \{P'_n, \ldots, P'_m\} \text{ if } n<m$$

$$^1_\square P' = \{P'_1, \ldots, P'_m, P'_n, \ldots, P'_p\}, ^1_\square P' = \{P'_{m+1}, \ldots, P'_n\} \text{ if } n<m$$

For the example field, $\beta_{ij}$ is described in Table 1 below.

TABLE 1

| j | i | | | | | |
|---|---|---|---|---|---|---|
| | 1 | 2 | 3 | 4 | 5 | 6 |
| 1 | — | 38.24 | 32.79 | -4.22 | 16.76 | — |
| 2 | — | — | 29.96 | 23.26 | 19.23 | 38.18 |
| 3 | 23.21 | — | — | 41.13 | 39.04 | 43.31 |
| 4 | 28.25 | 21.46 | — | — | 46.61 | 47.95 |
| 5 | 18.55 | 22.46 | 36.84 | — | — | 69.48 |
| 6 | 14.50 | 28.13 | 47.40 | 35.48 | — | — |

Therefore, $\beta_{nm}$=14.50, n=1, m=6. Again, since O1 and O2 are both triangles and, therefore, only have three points, it is impossible for a self-edge interception to occur.

Case 3:

The two-polygon interception occurs when two polygon sets, such as a field boundary and an obstacle boundary, intercept. Please note: if two polygons are created due to case 2, it is impossible that these two polygons can intercept.

$$^{gh}_\square \gamma_{ij} = \frac{^h_\square P_j - ^h_\square P_{j+1} - ^g_\square P_i}{^g_\square A_i + ^h_\square A_j - ^h_\square A_{j+1}} : i = 1 \ldots ^g_\square p, j = 1 \ldots ^h_\square p - 1,$$

$$g, h = 1, \ldots N, g \neq h$$

where N, is the number of active sets describing polygons.

$$^{kl}_\square \gamma_{nm} = \min\left\{\min\left\{\min\left\{^{gh}_\square \gamma_{ij}\right\}_j\right\}_h\right\}_g$$

If a two-polygon interception occurs, the two polygons become merged together to form a new polygon, with the original two polygons being removed.

$$^g_\square P'_i = ^g_\square P_i + ^{kl}_\square \gamma_{nm} * ^g_\square A_i; \; i=1 \ldots ^g_\square p, g=1, \ldots, N$$

$$P = \{^k_\square P_1, \ldots, ^k_\square P_n, ^l_\square P_{m+1}, \ldots, ^{l P}_\square p, ^l_\square P_1, \ldots, ^l_\square P_m, \ldots, ^k_\square P_n, \ldots, ^{kP g}_\square p\}$$

For the example with the field boundary being $^1$P, and the obstacles $O_1$ and $O_2$ being $^2$P and $^3$P, respectively, then $^{gh}_\square \gamma_{ij}$ is described by Table 2.

TABLE 2

| | | g | | | | | | | | | | |
|---|---|---|---|---|---|---|---|---|---|---|---|---|
| | | 1 | | | | | 2 | | | 3 | | |
| | | i | | | | | | | | | | |
| h | j | 1 | 2 | 3 | 4 | 5 | 6 | 1 | 2 | 3 | 1 | 2 | 3 |
| 1 | 1 | | | | | | | 2219 | 5.46 | — | — | 17.13 | 525.1 |
| | 2 | | | | | | | 31.77 | — | 160 | 13.56 | 106.3 | — |
| | 3 | | | | | | | 32.19 | — | — | — | — | 13.20 |
| | 4 | | | | | | | 40.43 | 124.6 | — | 76.56 | 14.05 | — |

TABLE 2-continued

| | | g | | | | | | | | | |
|---|---|---|---|---|---|---|---|---|---|---|---|
| | | 1 | | | | | | 2 | | 3 | |
| | | i | | | | | | | | | |
| h | j | 1 | 2 | 3 | 4 | 5 | 6 | 1 | 2 | 3 | 1 | 2 | 3 |
| | 5 | | | | | | | 23.38 | — | — | 125.2 | 10.02 | — |
| | 6 | | | | | | | — | — | 6.76 | 70.31 | 15.43 | — |
| 2 | 1 | — | — | — | — | 4.54 | — | | | | — | 123.4 | 162.5 |
| | 2 | 5.22 | — | — | — | — | — | | | | — | — | — |
| | 3 | — | — | — | — | — | 0.93 | | | | — | — | — |
| 3 | 1 | — | 6.09 | — | — | — | — | — | — | — | | | |
| | 2 | 8.56 | — | — | — | — | — | 8.58 | 15.10 | — | | | |
| | 3 | — | — | 11.17 | — | — | — | — | — | — | | | |

Therefore, $_{\square}^{kl}\gamma_{nm}$=0.93, k=1, l=2, n=6, m=3.

To create the inner boundary of the headlands for a field boundary, with or without field objects, an iterative algorithm is used. The algorithm limits the accumulated distance moved to be no larger than the sort after working width.

W=working width

```
While (W>0)
    Calculate α_n, β_ij, and ^{gh}γ_ij, where approriate
    λ = min{α_n,β_nm,^{kl}γ_nm,W}
    Calculate P',V',A' using λ
    W = W −λ
End while
```

Figure 7:
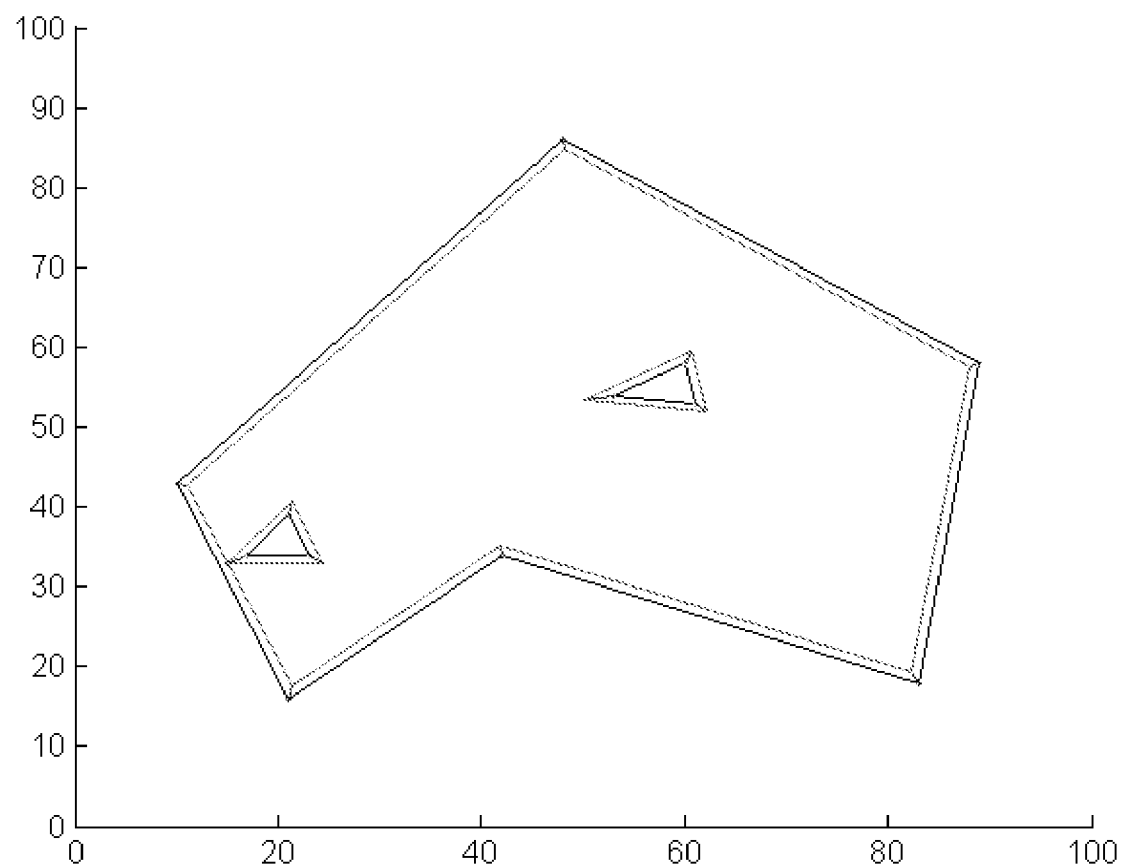

For example, if a working width of 3 is used, the iteration of the loop is, $\lambda = \min\{\alpha_n, \beta_{nm}, {}_{\square}^{kl}\gamma_{nm}, W\} = \min\{14.89, 14.50, 0.93, 3\} = 0.93$ This means that the first interception to occur is the two-polygon interception between the field boundary and the first obstacle. The field boundary and the first obstacle then become merged together and the process continues. See FIG. 7.

At the next iteration of the loop, P is now ([24.38,33.07], [21.27,40.84],[15.06,33.07],[11.08,42.82],[48.15,84.76], [87.99,57.56],[82.25,19.30],[41.82,35.07],[21.38,17.55], [15.06,33.07]) and $O_2$ is now ([60.66,59.45],[50.10,53.42], [62.17,51.91]).

The new interceptions are as follows

α=[−,−,4.53,37.25,20.58,66.52,34.19,5.83,915.86].

Therefore, $\alpha_n$=4.53

$\beta_{ij}$

| | $\beta_{ij}$ | | | | | | | | | |
|---|---|---|---|---|---|---|---|---|---|---|
| | | | | | i | | | | | |
| j | 1 | 2 | 3 | 4 | 5 | 6 | 7 | 8 | 9 | 10 |
| 1 | — | — | — | — | — | — | — | 3.61 | — | — |
| 2 | — | — | — | 4.29 | — | — | — | — | — | — |
| 3 | — | — | — | — | — | — | — | — | — | — |
| 4 | 2219 | — | — | — | — | — | — | — | — | — |
| 5 | 30.84 | — | — | — | — | — | 22.36 | — | 37.25 | — |
| 6 | 31.27 | — | 35.22 | — | — | — | — | — | 35.22 | — |
| 7 | 39.51 | — | 46.73 | — | — | — | — | — | 46.73 | — |
| 8 | 22.45 | — | 34.19 | 14.76 | — | — | — | — | — | — |
| 9 | — | — | — | — | — | — | — | — | — | — |
| 10 | — | — | — | — | — | — | — | — | — | — |

| | | ${}^{gh}\gamma_{ij}$ | | | | | | | | | | |
|---|---|---|---|---|---|---|---|---|---|---|---|---|
| | | g | | | | | | | | | | |
| | | 1 | | | 2 | | | | | | | |
| | | i | | | | | | | | | | |
| h | j | 1 | 2 | 3 | 1 | 2 | 3 | 4 | 5 | 6 | 7 | 8 | 9 | 10 |
| 1 | 1 | | | | — | — | — | — | 5.16 | — | — | — | — |
| | 2 | | | | 7.65 | — | 9.78 | 7.63 | — | — | — | — | — |
| | 3 | | | | — | — | — | — | — | 10.24 | — | — | — |
| 2 | 1 | — | 122.50 | 161.5 | | | | | | | | | |
| | 2 | — | — | — | | | | | | | | | |
| | 3 | — | — | — | | | | | | | | | |
| | 4 | — | 16.20 | 524.2 | | | | | | | | | |

-continued

| | | $\gamma_{ij}$ | | | | | | | | | | | |
|---|---|---|---|---|---|---|---|---|---|---|---|---|---|
| | | | | g | | | | | | | | | |
| | | 1 | | | | 2 | | | | | | | |
| | | | | | | i | | | | | | | |
| h | j | 1 | 2 | 3 | 1 | 2 | 3 | 4 | 5 | 6 | 7 | 8 | 9 | 10 |
| | 5 | 12.63 | 105.3 | — | | | | | | | | | | |
| | 6 | — | — | 12.27 | | | | | | | | | | |
| | 7 | 75.63 | 13.12 | — | | | | | | | | | | |
| | 8 | 124.2 | 9.09 | — | | | | | | | | | | |
| | 9 | 69.38 | 14.51 | — | | | | | | | | | | |
| | 10 | — | 127.7 | 190.2 | | | | | | | | | | |

Figure 8:
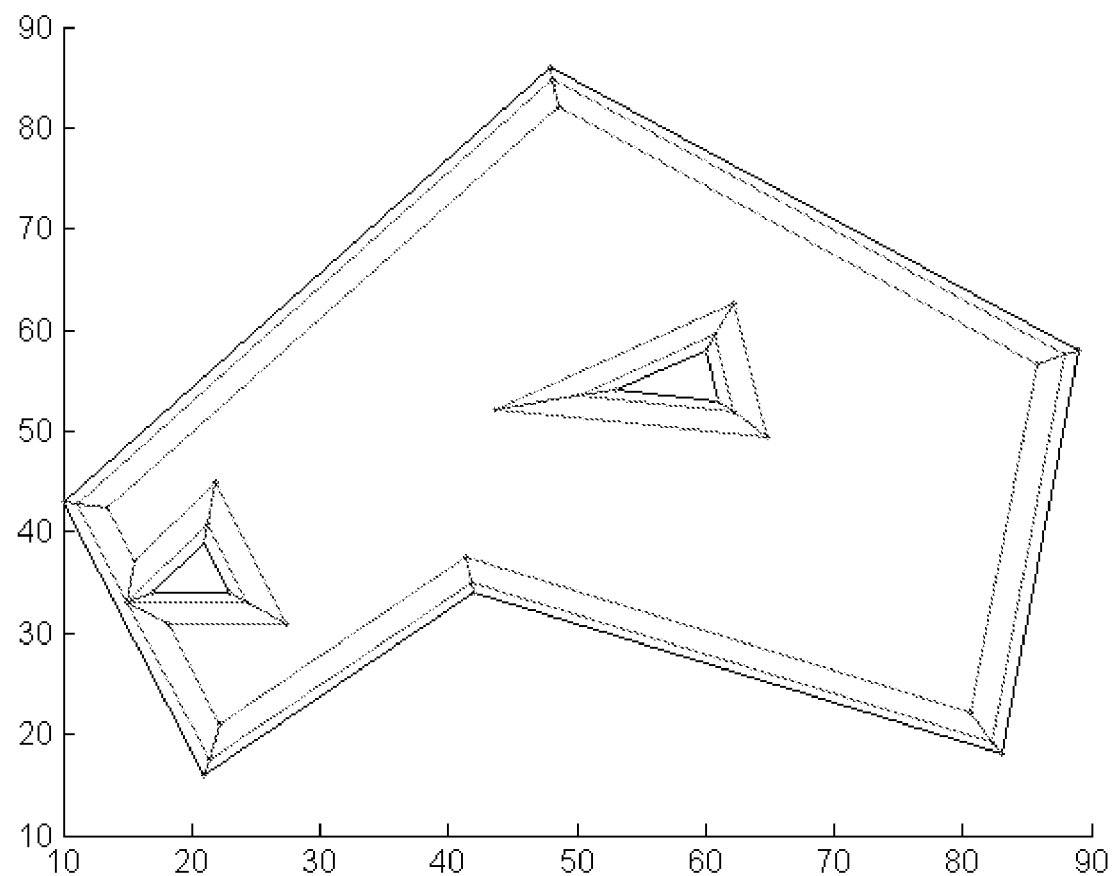

$\lambda = \min\{\alpha_n, \beta_{nm}, \gamma_{nm}^{kl}, W\} = \min\{4.53, 4.29, 5.16, 2.07\} = 2.07$ Since W is now smaller than the other parameters there is no need to do a third iteration, as W=0 in the next iteration. Therefore, the resultant polygons are {[27.43,31], [21.87, 44.89], [15.64,37.1], [13.48,42.41], [48.49,82.03], [85.75, 56.58], [80.59,22.16], [41.41,37.45], [22.21,20.99], [18.13, 31], [62.12,62.67], [43.70,52.14], [64.76,49.51]}, see FIG. 8.

If multiple headland passes are required then the resultant polygons are used as the outer boundaries of the next set of headlands. This method will be known as movePolygonSet and it will need a set of polygons and a distance to generate a new set of polygons, such that.

movePolygonSet({$_\square^1 P, \ldots, _\square^N P$}, W) ⇒ {$_\square^1 P', \ldots, _\square^M P'$}

It should be noted that in case any obstacle is not from the outset defined by a boundary being a polygon, that obstacle is approximated to an obstacle polygon and the headland around that obstacle is defined relative to that obstacle polygon.

Working Rows

After all of the headlands have been calculated the area remaining inside of the field boundary and outside of any remaining obstacles is considered the working area. See FIG. 9.

For example, one of the obstacles became integrated with the headland while the other remained separate. The outer boundary of the working area is P={[27.43,31],[21.87, 44.89],[15.64,37.1],[13.48,42.41],[48.49,82.03],[85.75, 56.58],[80.59,22.16],[41.41,37.45],[22.21,20.99],[18.13, 31]} and the hole created by the remaining obstacle is $H^1$={[62.12,62.67],[43.70,52.14],[64.76,49.51]}

The working rows are plotted as parallel rectangles across the working area, which have a width equal to the working width of the vehicle. The working rows are parallel to the driving direction of the field. Theoretically, this could be any direction, which would give an infinite set of possible directions. However, to simplify the calculation, a limited set of directions parallel to all the edges of the remaining work area (both from the inside and outside) is used.

For example, the set of possible driving directions D= {[−0.38,0.93], [−0.62,−0.78], [−0.37,0.93], [0.66,0.75], [0.83,−0.56], [−0.15,−0.99], [−0.93,0.36], [−0.76,−0.65], [−0.38,0.93], [1,0], [−0.87,−0.5], [0.99,−0.12], [−0.2,0.98]}.

The working rows are calculated between two parallel lines, $L^i$ and $R^i$. These are the bounding left and right sides, respectively, of the working row. $L^i$ is defined as a straight line between the points $L_1^i$ and $L_2^i$, and $R^i$ is defined as a straight line between $R_1^i$ and $R_2^i$. The first left side $L^1$ starts at the furthest most left point of the boundary, with respect to the driving direction, and extends from the furthest most back point, $L_1^1$, to the furthest most forward point, $L_2^1$, with respect to the driving direction, of the boundary. The first right side $R^1$ is the transposition of $L^1$ a distance equal to the working width to the right, with respect to the driving direction.

$\alpha_1 = \min\{DD \circ P_j\}_j$ $\alpha_2 = \max\{DD \circ P_j\}_j$ $\beta = \min\{DD^\perp \circ P_j\}_j$ $L_1^1 = \alpha_1 * DD + \beta * DD^\perp$ $L_2^1 = \alpha_2 * DD + \beta * DD^\perp$ $R_1^1 = \alpha_1 * DD + (\beta + W) * DD^\perp$ $R_2^1 = \alpha_2 * DD + (\beta + W) * DD^\perp$ $L_1^i = \alpha_1 * DD + ((i-1) * W + \beta) * DD^\perp$ $L_2^i = \alpha_2 * DD + ((i-1) * W + \beta) * DD^\perp$ $R_1^i = \alpha_1 * DD + (\beta + i * W) * DD^\perp$ $R_2^i = \alpha_2 * DD + (\beta + i * W) * DD^\perp, 1 \le i \le \left\lceil \frac{\max\{DD^\perp \circ P_j\}_j}{W} \right\rceil$ The maximum area of the each working row, MWR, is then defined as a polygon such that $MWR^i = [L_1^i, L_2^i, R_2^i, R_1^i]$. The area covered by each row, RCA, is then intersection between the maximum area of each working row, MWR, and the complement of any holes in the work area, H, and the outer boundary of the work area, P. If P is convex and there are no holes in the work area then the intersection will result in only one polygon. However, if these conditions are not met, then it may be the case that the intersection produces more than one polygon.

$(P/H) \cap MWR = RCA$

Figure 10:
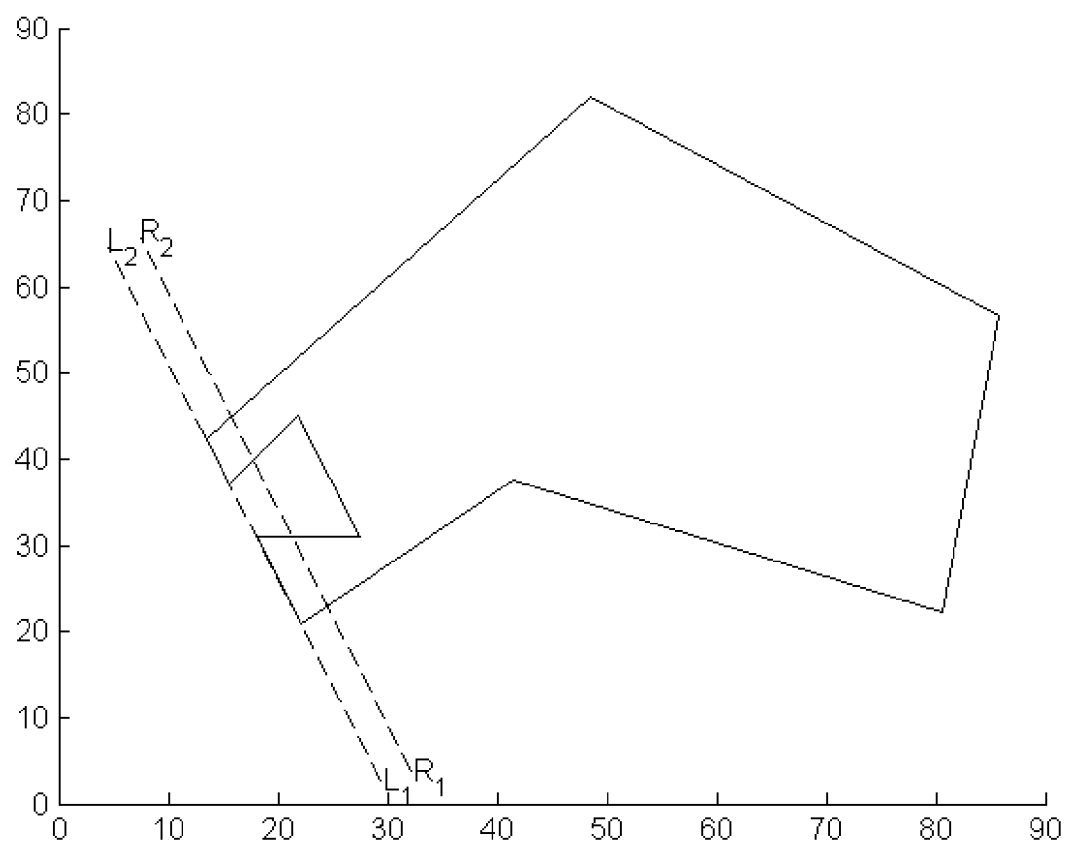

For each resultant intersection the working row, WR, is then plotted as such:

$\gamma_1 = \min\{DD \cdot (_\square^i RCA_j^k - L_1^i)_j\}$ $\gamma_1 = \max\{DD \cdot (_\square^i RCA_j^k - L_1^i)_j\}$ $_\square^i WR_1^k = L_1^i + \gamma_1 * DD$ $_\square^i WR_2^k = L_2^i + \gamma_1 * DD$ $_\square^i WR_3^k = L_1^i + \gamma_2 * DD + W * DD^\perp$ $_\square^i WR_4^k = L_1^i + \gamma_1 * DD + W * DD^\perp$ In the example, for the first driving direction, $DD=D_1=[-0.38, 0.93]$, therefore, $\alpha_1=-9.35$, $\alpha_2=58.15$, and $\beta=28.26$. The four points of $MWR^1$ are as follows, and shown in FIG. 10.

$L_1^1=-9.35*[-0.38,0.93]+28.26*[0.93,0.38]=[29.72, 1.81]$ $L_2^1=58.15*[-0.38,0.93]+28.26*[0.93,0.38]=[4.65, 64.49]$ $R_1^1=-9.35*[-0.38,0.93]+(28.26+3)*[0.93,0.38]=[32.5,2.93]$ $R_2^1=58.15*[-0.38,0.93]+(28.26+3)*[0.93,0.38]=[7.43,65.5]$

Figure 11:
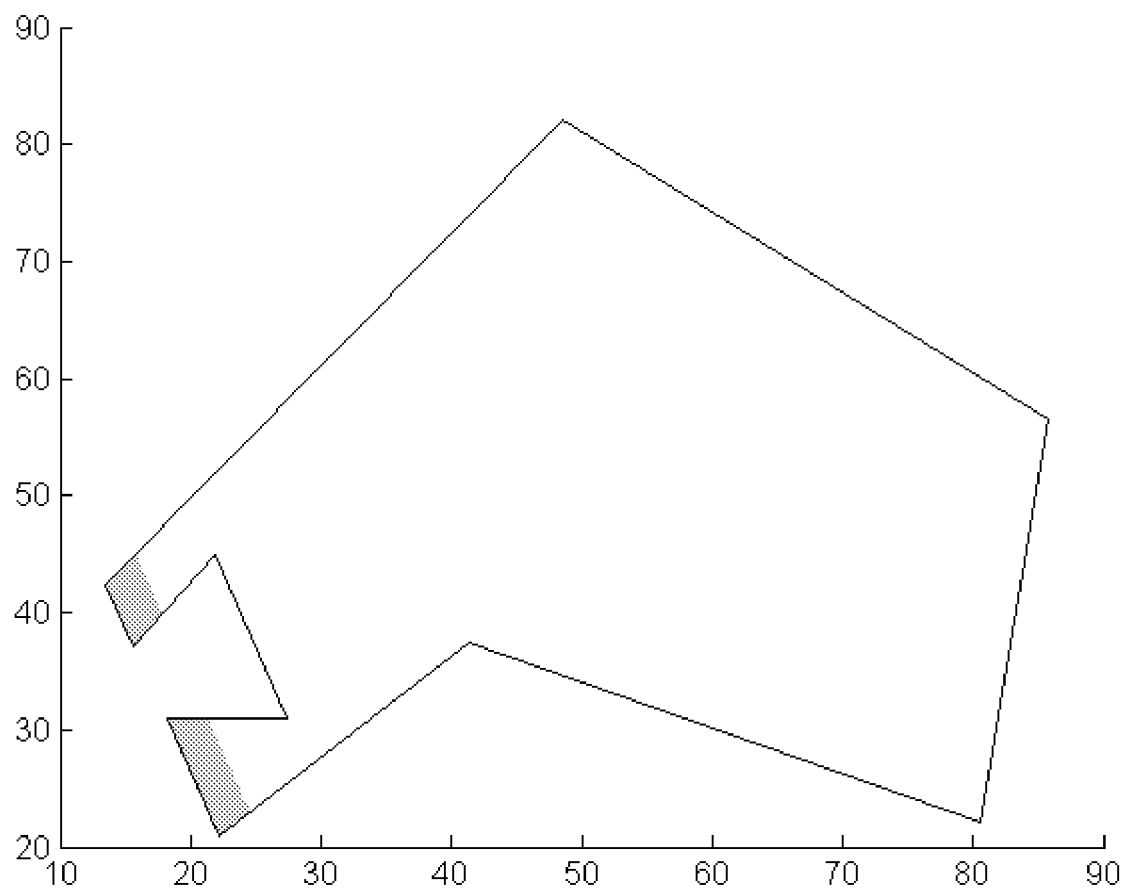

Therefore, $MWR^1=\{[29.72, 1.81], [4.65,64.49], [7.43, 65.5], [32.5,2.93]\}$. The intersection results in two polygons, see FIG. 11, $^1RCA^1=\{[17.77, 39.76], [15.64, 37.1], [13.48, 42.41], [15.71, 44.93]\}$, $^1RCA^2=\{[24.49, 22.95], [22.21, 20.98], [18.13, 31], [21.27, 31]\}$.

Figure 12:
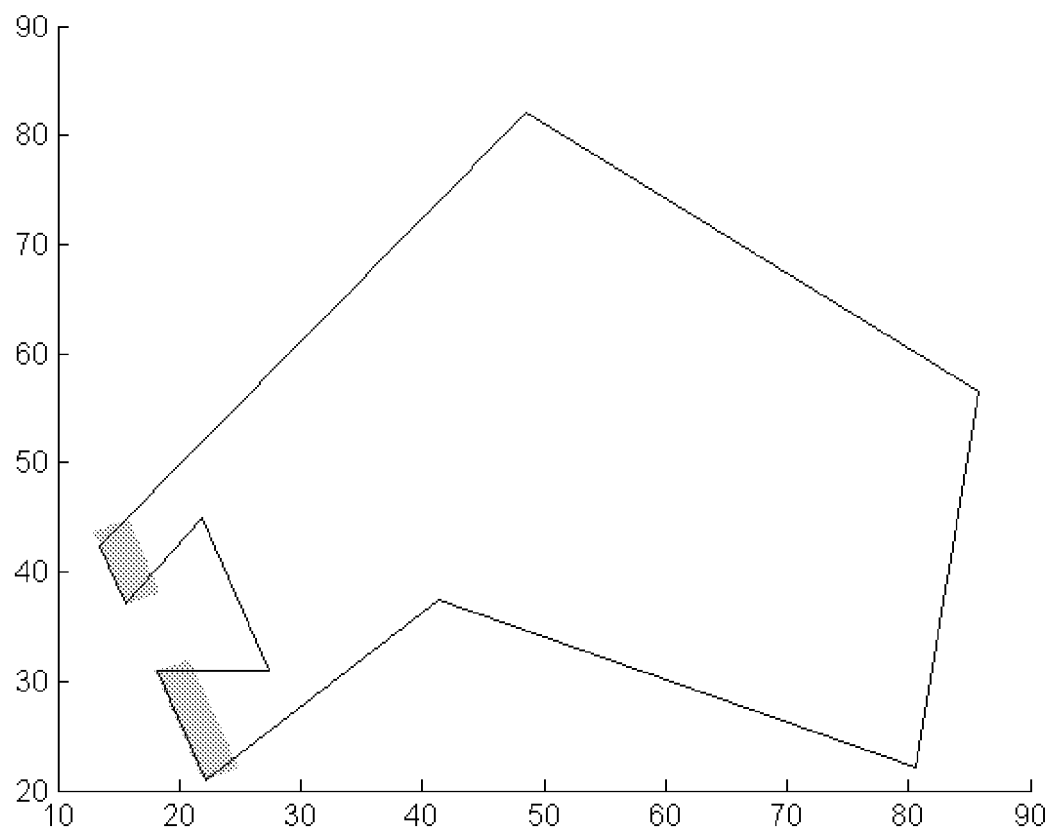

Finally, the two working rows are, $^1WR^2=\{[15.61, 37.09], [12.92, 43.81], [15.7, 44.93], [18.39, 38.2]\}$ and $^1WR^2=\{[22.07, 20.93], [18.06, 30.97], [20.84, 32.09], [24.86, 22.05]\}$, see FIG. 12.

Figure 13:
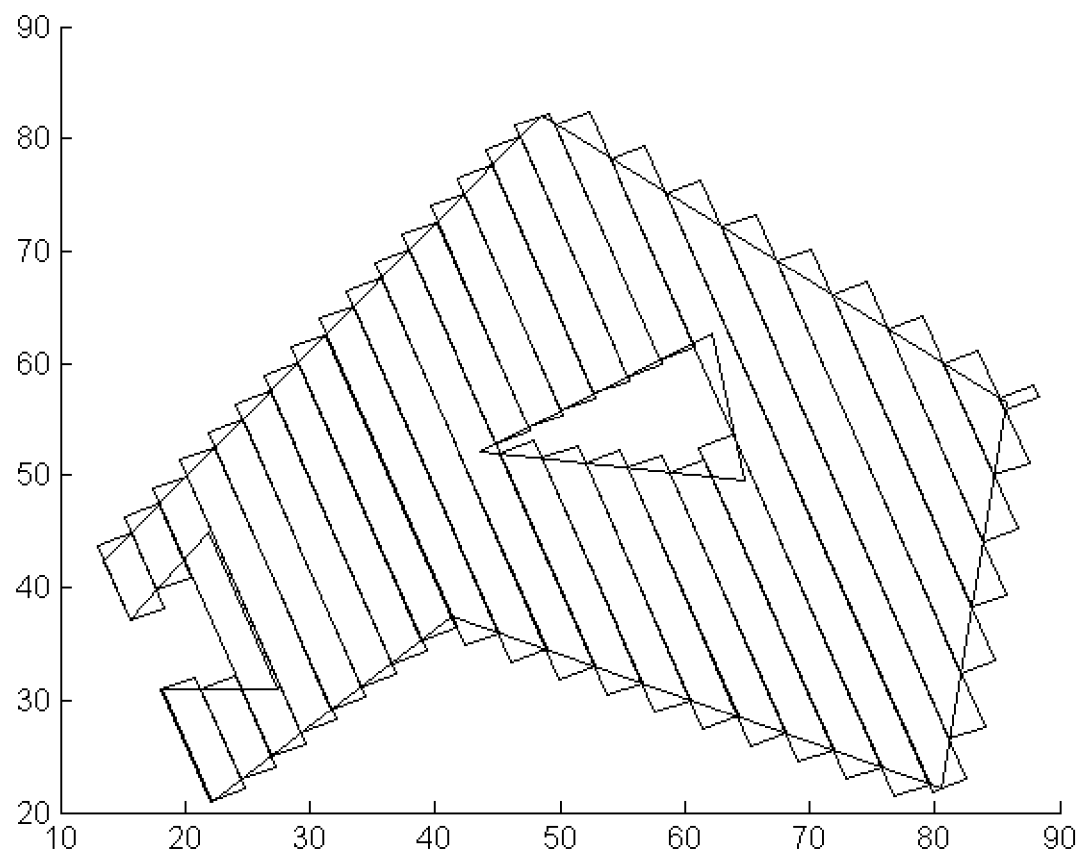

FIG. 13 shows all of the working rows generated across the field in respect of one possible orientation of working rows.

Creation of Possible Driving Paths

Figure 14:
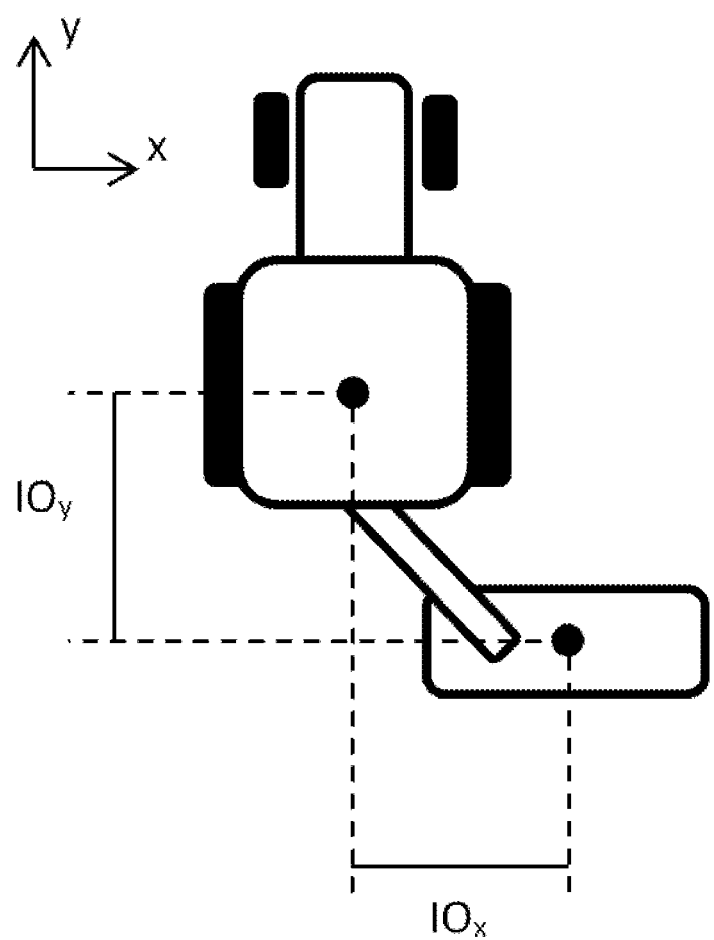

So that a vehicle can navigate the rows and the headlands, driven paths need to be generated for both the headlands and the working rows. The driven paths are plotted down the middle of the defined working rows and headlands. However, an offset, $IO=[IO_x,IO_y]$, can also be included between the vehicle center and the implement center in order for the implement center to maintain a central position on the working row (see FIG. 14).

For each working row WR there are two, $DR_+$ and $DR_-$, one in same direction as the driving direction and one in the opposite direction as the driving direction. Each DR starts at SDR and ends at EDR.

$$\theta = \left(\frac{DD_x}{|DD_x|}\right) * \cos^{-1}\left(\frac{DD_y}{\|DD\|}\right)$$

$$^i_\square SDR_+^k = L_1^i + \gamma_1 * DD + 0.5 * W * DD^\perp - IO * \begin{bmatrix} \cos(\theta) & -\sin(\theta) \\ \sin(\theta) & \cos(\theta) \end{bmatrix}$$

$$^i_\square EDR_+^k = L_1^i + \gamma_2 * DD + 0.5 * W * DD^\perp - IO * \begin{bmatrix} \cos(\theta) & -\sin(\theta) \\ \sin(\theta) & \cos(\theta) \end{bmatrix}$$

$$^i_\square DR_+^k = [^i_\square SDR_+^k, ^i_\square EDR_+^k]$$

$$^i_\square SDR_-^k =$$
$$L_1^i + \gamma_2 * DD + 0.5 * W * DD^\perp - IO * \begin{bmatrix} \cos(\theta+\pi) & -\sin(\theta+\pi) \\ \sin(\theta+\pi) & \cos(\theta+\pi) \end{bmatrix}$$

$$^i_\square EDR_-^k = L_1^i + \gamma_1 * DD + 0.5 * W * DD^\perp - IO * \begin{bmatrix} \cos(\theta+\pi) & -\sin(\theta+\pi) \\ \sin(\theta+\pi) & \cos(\theta+\pi) \end{bmatrix}$$

$$^i_\square DR_-^k = [^i_\square SDR_-^k, ^i_\square EDR_-^k]$$

In the example, the vehicle has an offset $IO=[1, -1]$, and taking the example of the first WR, $^1WR^1$, the two DR can be found as:

$$\theta = \left(\frac{-0.38}{0.38}\right) * \cos^{-1}\left(\frac{0.93}{1}\right) = -0.376$$

$$^1_\square SDR_+^1 = [29.72 \ 1.81] + 37.99 * [-0.38 \ 0.93] +$$
$$0.5 * 3 * [0.93 \ 0.38] + [1 \ -1] * \begin{bmatrix} 0.93 & 0.37 \\ -0.37 & 0.93 \end{bmatrix} = [15.70 \ 38.21]$$

$$^1_\square EDR_+^1 = [29.72 \ 1.81] + 45.23 * [-0.38 \ 0.93] +$$
$$0.5 * 3 * [0.93 \ 0.38] + [1 \ -1] * \begin{bmatrix} 0.93 & 0.37 \\ -0.37 & 0.93 \end{bmatrix} = [13.01 \ 44.93]$$

$$^1_\square SDR_-^1 = [29.72 \ 1.81] + 45.23 * [-0.38 \ 0.93] + 0.5 *$$
$$[0.93 \ 0.38] + [1 \ -1] * \begin{bmatrix} -0.93 & -0.37 \\ 0.37 & -0.93 \end{bmatrix} = [15.61 \ 43.81]$$

$$^1_\square EDR_-^1 = [29.72 \ 1.81] + 37.99 * [-0.38 \ 0.93] + 0.5 * 3 *$$
$$[0.93 \ 0.38] + [1 \ -1] * \begin{bmatrix} -0.93 & -0.37 \\ 0.37 & -0.93 \end{bmatrix} = [18.30 \ 37.09]$$

Figure 15:
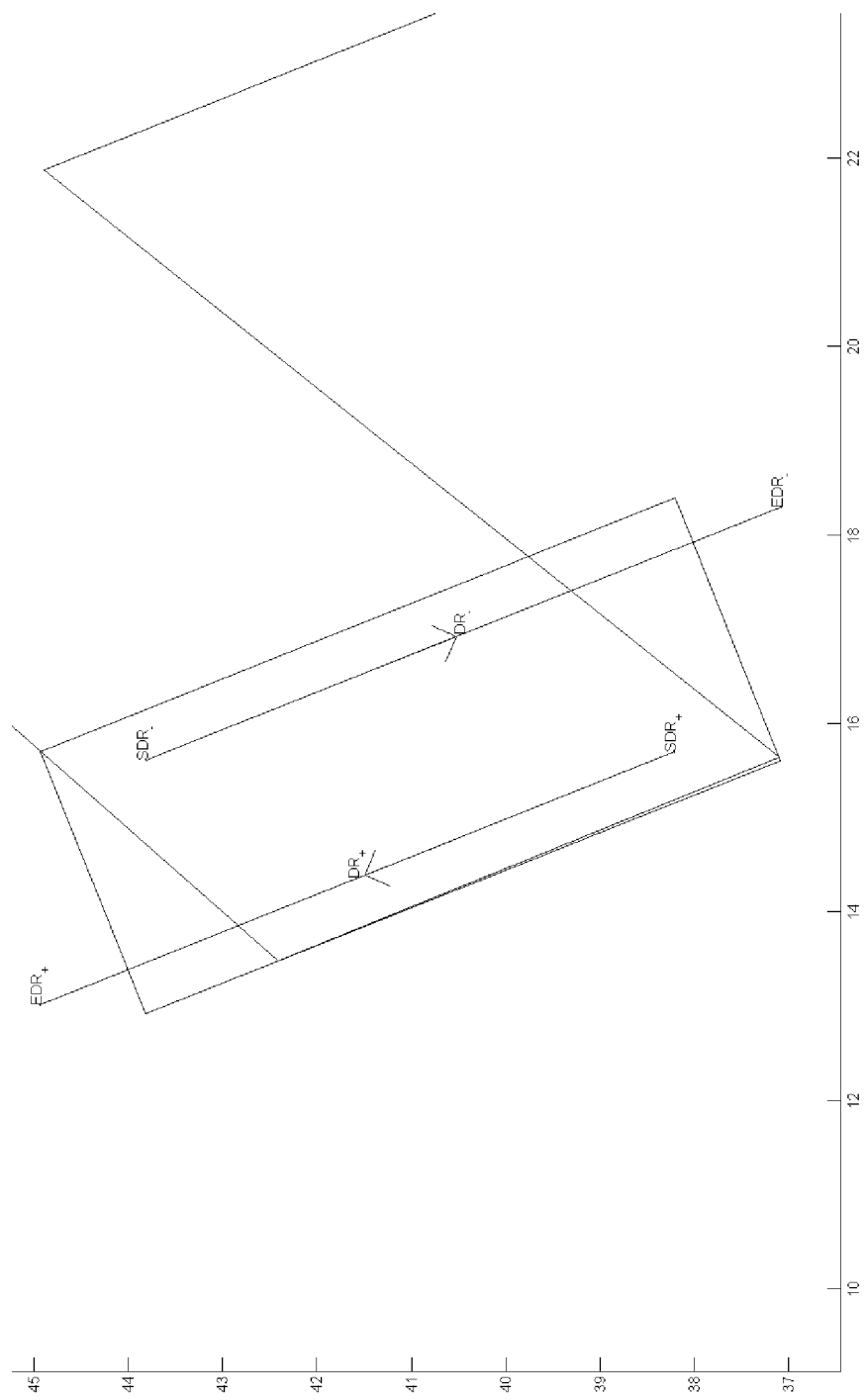

See FIG. 15.

Driven paths are also calculated for the headlands, each headland has two driven paths with one in a clockwise orientation and the other in an anti-clockwise orientation. The headland driven paths must also account for any implement offset are described above. The driven paths of the headlands are calculated using the center of each headland, which is in turn calculated from the inner boundaries. To find the center of a headland, the simplified version of the movePolygonSet method is used. If called movePolygonSetBack, the method requires a single polygon and a distance to move. As in the movePolygonSet method, polygon P is defined as a number of points and V and A can be derived from P; however, the constraint placed on A is different such that $A_i$ is always to the left of $V_i$.

$$V_i = P_{i+1} - P_i : i = 1 \ldots p-1$$

$$V_p = P_1 - P_p$$

$$\frac{A_i \cdot -V_{i-1}}{|A_i||V_{i-1}|} = \cos\theta = \frac{A_i \cdot V_i}{|A_i||V_i|},$$

$$\frac{A_i \cdot [V_{i,y} \ -V_{i,x}]}{|A_i||V_i|} > \frac{A_i \cdot [-V_{i,y} \ V_{i,x}]}{|A_i||V_i|}$$

$$|A_i| = \frac{1}{\sin\theta}$$

$$P_i' = P_i + \lambda * A_i : i = 1, \ldots, p$$

The iterative process it also simplified as there is only one polygon, such that.

```
While (W>0)
    Calculate α_n, where appropirate
    λ = min{a_n,W}
    Calculate P',V',A' using λ
    W = W -λ
End while
```

For the example of the first headland where P={[27.43, 31], [21.87,44.89], [15.64,37.1], [13.48,42.41], [48.49, 82.03], [85.75,56.58], [80.59,22.16], [41.41,37.45], [22.21, 20.99], [18.13,31]} and W=1.5, this creates α=[-,-, 2.46, 35.17,29.88,18.52,64.45,32.12,3.76,913.79], and since λ=min{α_n,W}, therefore, λ=1.5 and resultant polygon is P={[25.22,32.5], [21.44,41.95], [15.22,3417], [11.74, 42.70], [48.24,84.01], [87.38,57.29], [81.79,20.08], [41.71, 35.72], [21.60,18.49], [15.90,32.50]}.

Since the headlands need two driven paths, one in each direction, these can be derived from $P^1$, the resultant of the movePolgonSetBack method, and $P^2$, which is the reversal $P^1$. The offset IO is again used to create the straight driven path, $SD^j$, for each direction around the headland. $SD^j$ has twice as many points as the polygon, $P^j$, it is derived from, such that:

$$P^j = \{P_1^j, \ldots, P_p^j\}, SD^j = \{SD_1^j, \ldots, SD_{2*p}^j\}$$

$$V_i = P_{i+1} - P_i : i = 1 \ldots p-1$$

$$V_p = P_1 - P_p$$

$$\theta_i = \left(\frac{V_{i,x}}{|V_{i,x}|}\right) * \cos^{-1}\left(\frac{V_{i,y}}{\|V_i\|}\right)$$

$$SD_{2*i-1}^j = P_i^j - IO * \begin{bmatrix} \cos(\theta_i) & -\sin(\theta_i) \\ \sin(\theta_i) & \cos(\theta_i) \end{bmatrix} : i = 1, \ldots, p$$

$$SD_{2*i}^j = P_{i+1}^j - IO * \begin{bmatrix} \cos(\theta_i) & -\sin(\theta_i) \\ \sin(\theta_i) & \cos(\theta_i) \end{bmatrix} : i = 1, \ldots, p-1$$

$$SD_{2*p}^j = P_1^j - IO * \begin{bmatrix} \cos(\theta_i) & -\sin(\theta_i) \\ \sin(\theta_i) & \cos(\theta_i) \end{bmatrix}$$

For the example for $P^1$, θ=[−0.38,−2.47,−0.39,0.72,2.17,−2.99,−1.2,−2.28,−0.39,1.57] and $SD^1$={[23.92,33.06], [20.14,42.5], [21.59,40.54], [15.37,32.77], [13.91,34.72], [10.44,43.25], [11.65,44.12], [48.16,85.43], [49.64,84.28], [88.77,57.55], [88.22,56.15], [82.64,18.94], [80.5,19.51], [40.41,35.16], [41.6,34.31], [21.5,17.08], [20.3,19.04], [14.59,33.05], [16.9,33.5], [26.22,33.5]}.

A third method is now introduced called the movePolygonSetForward method. This is exactly the same as the movePolygonSetBack method taking in a polygon and a distance and returning another polygon, however, the constraint on A is such that $A_i$ is always to the right of $V_i$.

$$\frac{A_i \cdot V_{i-1}}{|A_i||V_{i-1}|} = \cos\theta = \frac{A_i \cdot V_i}{|A_i||V_i|}, \frac{A_i \cdot [V_{i,y} \quad -V_{i,x}]}{|A_i||V_i|} < \frac{A_i \cdot [-V_{i,y} \quad V_{i,x}]}{|A_i||V_i|}$$

In order to make the straight driven line drivable by the vehicle, the vehicles minimum turning radius must be taken into account. Firstly the SD must be simplified to remove any corners too sharp for the vehicle. This is done by applying the movePolygonSetBack method and then the movePolygonSetForward method using the minimum turning radius (mtr) in succession until the methods create changes.

---

P = movePolygonSetBack(SD,mtr)
While (true)
 P' = movePolygonSetForward(P,2*mtr)
 P" = movePolygonSetBack(P',2*mtr)
 if (P==P")
  then Break while
  else P=P"
End while

---

$CS^1 = P$ $CS^2 = movePolygonSetForward(P,2*mtr)$ $CS^3 = P'$

For example, the vehicle's minimum turning radius (mtr) is 2 and, as previously stated, $SD^1$={[23.92,33.06], [20.14, 42.5], [21.59,40.54], [15.37,32.77], [13.91,34.72], [10.44, 43.25], [11.65,44.12], [48.16,85.43], [49.64,84.28], [88.77, 57.55], [88.22,56.15], [82.64,18.94], [80.5,19.51], [40.41, 35.16], [41.6,34.31], [21.5,17.08], [20.3,19.04], [14.59, 33.05], [16.9,33.5], [26.22,33.5]}. Using the movePolygonSetBack($SD^1$,2) generates P={[26.69,31.50], [21.72,43.91], [15.49,36.12], [12.88,42.53], [12.99,42.61], [48.41,82.69], [48.45,82.66], [86.32,56.80], [86.27,56.67], [80.99,21.46], [26.00,42.92], [38.35,34.16], [22.00,20.15], [17.38,31.50]} and then using movePolygonSetForward(P, 4), P'={[20.78,35.5], [20.56,36.05], [14.37,28.31], [7.99, 43.97], [10.31,45.61], [47.91,88.16], [50.82,85.89], [91.21, 58.31], [90.16,55.63], [84.2,15.92], [42.29,32.28], [20.4, 13.51], [11.44,35.5]}. Finally, using movePolygonSetBack (P',4) generates P"={[26.69,31.5], [21.73,43.91], [15.5, 36.13], [12.89,42.54], [13,42.62], [48.41,82.69], [48.46, 82.66], [86.32,56.8], [86.27,56.67], [80.99,21.47], [41.51, 36.87], [22.01,20.16], [17.38,31.5]}.

As can be seen, P" is not the same as P so the loop must be restated with P=P", d movePolygonSetForward(P",4) generates P'={[20.78,35.5], [20.56,36.05], [14.37,28.31], [7.99,43.97], [10.31,45.61], [47.91,88.16], [50.82,85.89], [91.21,58.31], [90.16,55.63], [84.2,15.92], [42.29,32.28], [20.4,13.51], [11.44,35.5]} and movePolygonSetBack(P',4) generates P"={[26.69,31.5], [21.73,43.91], [15.5,36.13], [12.89,42.54], [13,42.62], [48.41,82.69], [48.46,82.66], [86.32,56.8], [86.27,56.67], [80.99,21.47], [41.51,36.87], [22.01,20.16], [17.38,31.5]}.

Now it can be seen that P"=P so the loop can be broken and $CS^1$={[26.69,31.5], [21.73,43.91], [15.5,36.13], [12.89, 42.54], [13,42.62], [48.41,82.69], [48.46,82.66], [86.32, 56.8], [86.27,56.67], [80.99,21.47], [41.51,36.87], [22.01, 20.16], [17.38,31.5]}, $CS^2$={[23.74,33.5], [21.15,39.98], [14.93,32.22], [10.44,43.25], [11.65,44.12], [48.16,85.43], [49.64,84.28], [88.77,57.55], [88.22,56.15], [82.6,18.69], [41.9,34.57], [21.2,16.83], [14.41,33.5]} and $CS^3$={[20.78, 35.5], [20.56,36.05], [14.37,28.31], [7.99,43.97], [10.31, 45.61], [47.91,88.16], [50.82,85.89], [91.21,58.31], [90.16, 55.63], [84.2,15.92], [42.29,32.28], [20.4,13.51], [11.44, 35.5]}.

The driven path of the headland is built as a sequence of straight lines and of arced lines. The straight lines are defined by a start point, $sp_i$, a start direction, $sd_i$, a and length, $l_i$, whereas the arced lines have a define center of rotation, cri. The center of rotation of the straight line can also be considered as infinitely far away from the start point in a direction perpendicular to the start direction.

Figure 16:
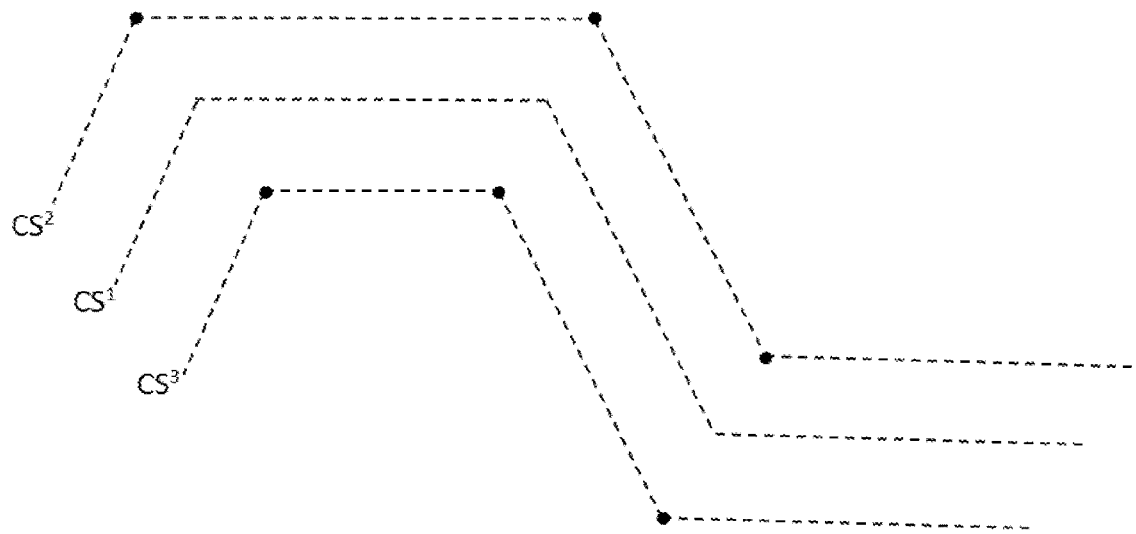

FIG. 16 shows an example of $CS^1$, $CS^2$, and $CS^3$ to define their relationship. The straight lines of the driven path are defined as parallel to the lines in $CS^1$. The corners of $CS^2$ and $CS^3$ are then used as the centers of the arced lines to link together the straight lines.

Figure 17:
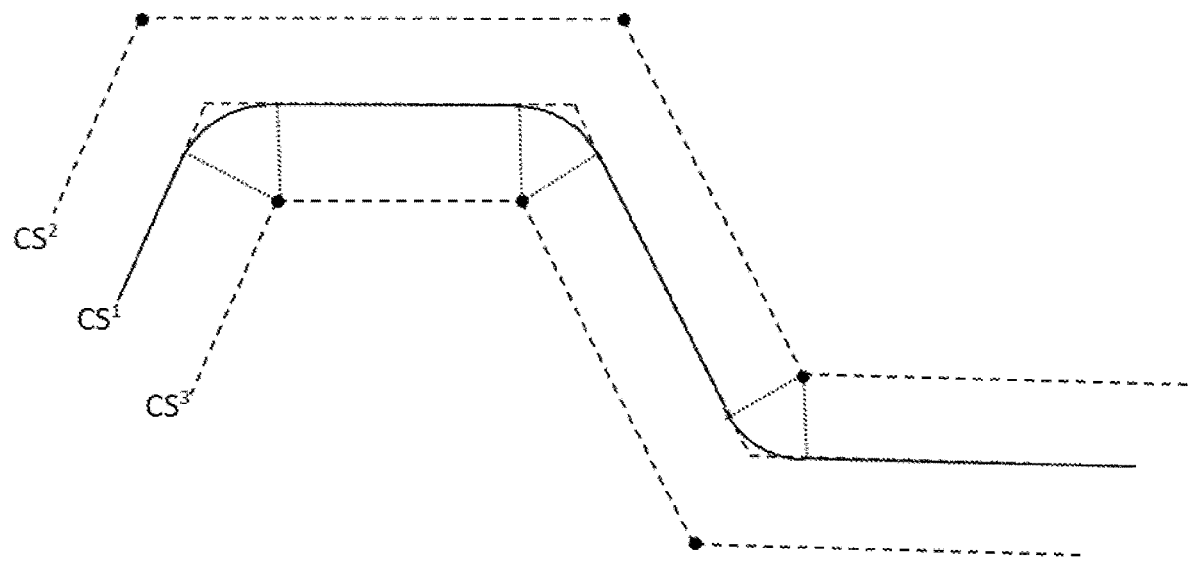

FIG. 17 shows an example of how the driven path is constructed.

Figure 18:
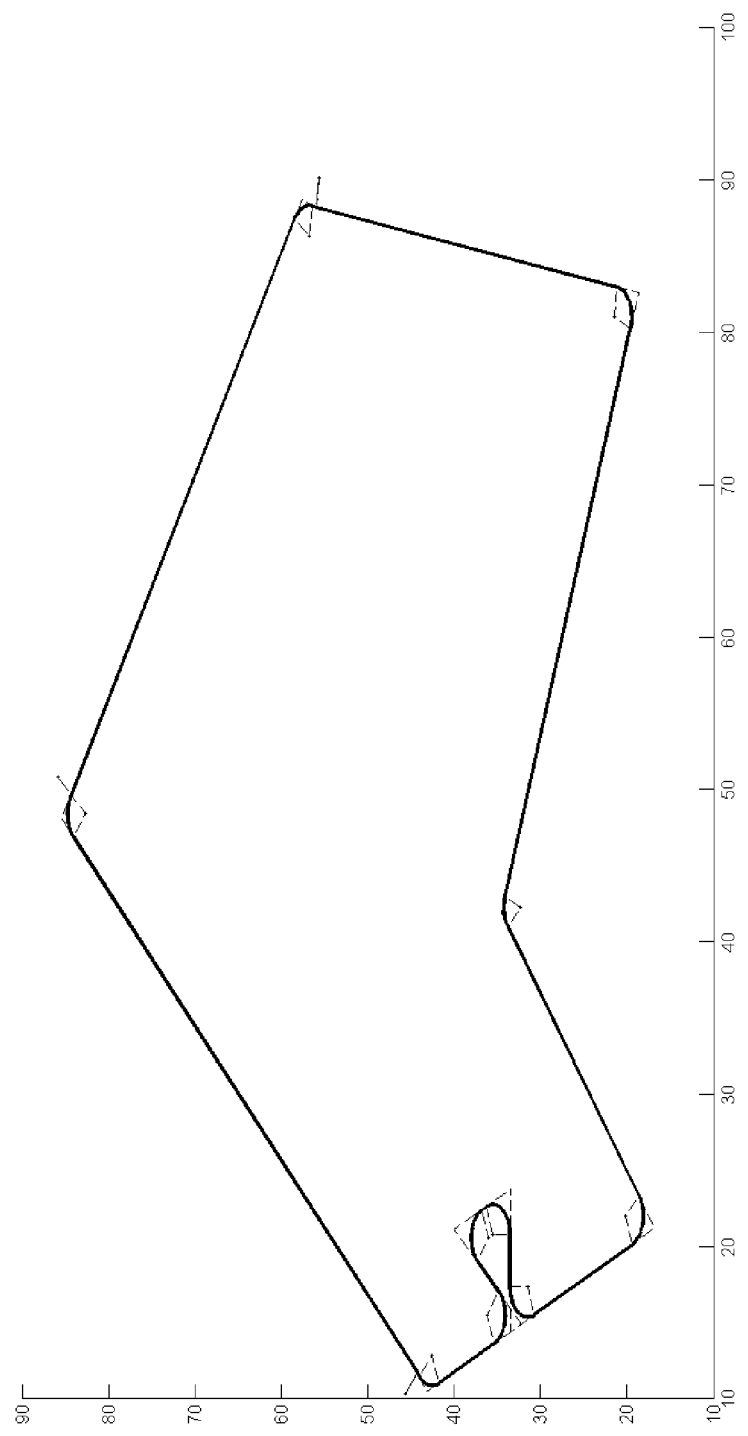

For the example, fields $CS^1$, $CS^2$, and $CS^3$ have already been calculated; therefore, Table 3 below describes the sequence of straight lines and arced lines; the example of the driven path is shown in FIG. 18.

TABLE 3

| i | Start point (sp$_i$) | Start direction (sd$_i$) | Length (l$_i$) | Centre of Rotation (cr$_i$) |
|---|---|---|---|---|
| 1 | [22.64, 36.24] | [−0.37, 0.93] | 0.60 | ~ |
| 2 | [22.42, 36.80] | [−0.37, 0.93] | 4.17 | [20.56, 36.05] |
| 3 | [19.00, 37.30] | [−0.62, −0.78] | 3.11 | ~ |
| 4 | [17.06, 34.88] | [−0.62, −0.78] | 4.16 | [15.50, 36.13] |
| 5 | [13.65, 35.37] | [−0.38, 0.93] | 6.92 | ~ |
| 6 | [11.04, 41.78] | [−0.38, 0.93] | 2.36 | [12.89, 42.54] |
| 7 | [11.48, 43.96] | [0.71, 0.70] | 0.33 | ~ |
| 8 | [11.71, 44.19] | [0.71, 0.70] | 0.14 | [10.31, 45.61] |
| 9 | [11.81, 44.29] | [0.66, 0.75] | 53.02 | ~ |
| 10 | [46.92, 84.02] | [0.66, 0.75] | 2.95 | [48.41, 82.69] |
| 11 | [49.59, 84.31] | [0.81, −0.59] | 0.07 | ~ |
| 12 | [49.64, 84.27] | [0.81, −0.59] | 0.05 | [50.82, 85.89] |
| 13 | [49.69, 84.24] | [0.83, −0.56] | 45.73 | ~ |
| 14 | [87.45, 58.45] | [0.83, −0.56] | 2.38 | [86.32, 56.80] |
| 15 | [88.28, 56.37] | [−0.21, −0.98] | 0.32 | ~ |
| 16 | [88.21, 56.06] | [−0.21, −0.98] | 0.13 | [90.16, 55.63] |
| 17 | [88.18, 55.93] | [−0.15, −0.99] | 35.15 | ~ |
| 18 | [82.97, 21.17] | [−0.15, −0.99] | 3.59 | [80.99, 21.47] |
| 19 | [80.27, 19.60] | [−0.93, 0.36] | 39.98 | ~ |
| 20 | [43.02, 34.14] | [−0.93, 0.36] | 2.16 | [42.29, 32.28] |
| 21 | [40.99, 33.79] | [−0.76, −0.65] | 23.29 | ~ |
| 22 | [23.31, 18.64] | [−0.76, −0.65] | 3.79 | [22.01, 20.16] |
| 23 | [20.15, 19.40] | [−0.38, 0.93] | 12.25 | ~ |
| 24 | [15.53, 30.75] | [−0.38, 0.93] | 3.92 | [17.38, 31.50] |
| 25 | [17.38, 33.50] | [1.00, 0.00] | 3.40 | ~ |
| 26 | [20.78, 33.50] | [1.00, 0.00] | 3.90 | [20.78, 35.50] |

Joining Driving Paths

To be able to plot a continual path for a vehicle to negotiate all of the headlands and working rows, connections are needed between the separate entities. Connections are created from working row driven path ends (EDR) to the driven paths of the headlands, and from the driven paths to the headland to working row driven path starts (SDR).

There are three types of connections that are used to connect a point to a path, and each connection type depends on whether it is connecting to a part of the driven path that is either: a straight line, an arced line in the same direction as the turn from the point, or an arced line in the opposite direction to the turn from the point.

Figure 19:
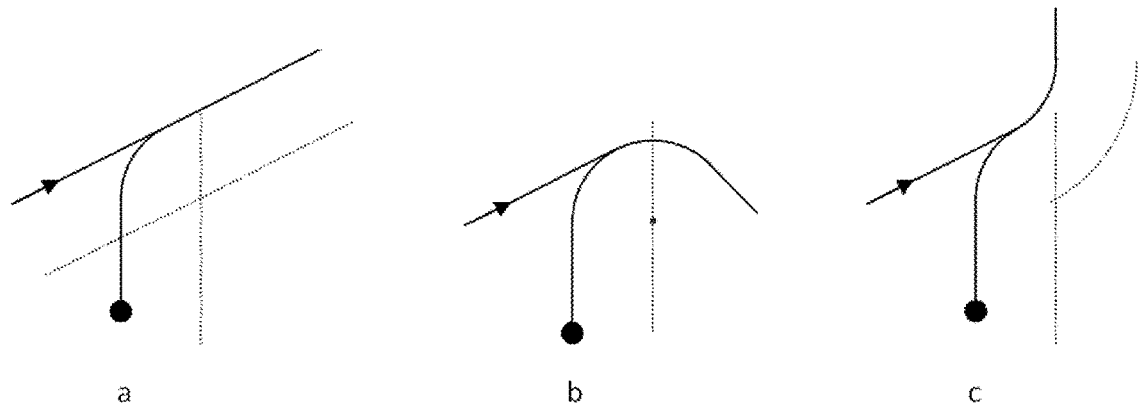

The first type of connection involves moving forward from the point in the specified direction and then making a single turn to join the other driven path, see FIG. 19.

To calculate the center of the single turn a line is plotted parallel to the specified direction at an offset of the turning radius perpendicular to the specified direction in the direction of the turn. The center of the single turn is defined as the intercept between this and a second line relating to the driven path. When joining the part of the path that is straight. In FIG. 19(a)) second line is plotted parallel to the driven path at an offset of the turning radius perpendicular to the driven path in the direction of the turn. When joining the part of the path that is an arced line in the same direction (FIG. 19(b)) the second line is in fact a point corresponding to the center of rotation of the arced line. When joining the part of the path that is an arced line in the opposite direction (FIG. 19(c)) the second line is an arced line with the same center as the driven path arced line, but with a radius that is twice as large.

Figure 20:
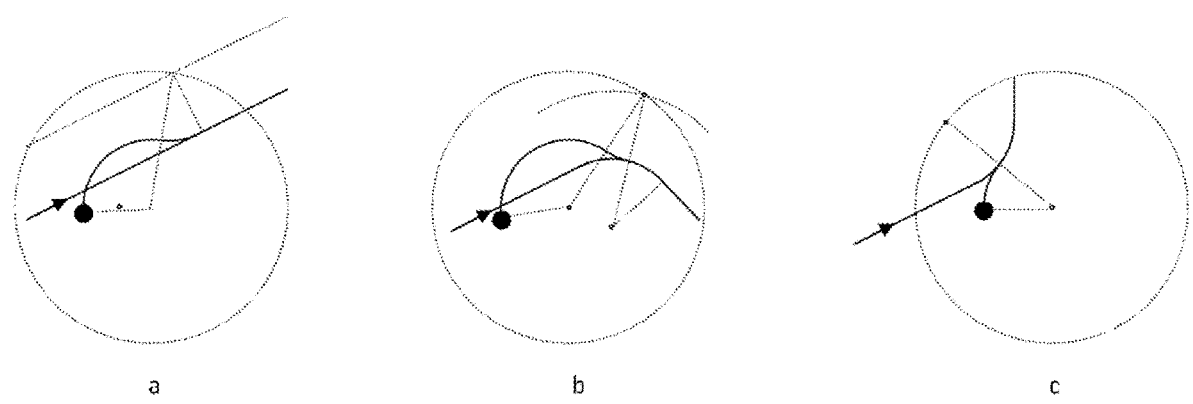

The second type of connection involves calculating two turns, in opposite directions, to join a point to the other driven path, see FIG. 20.

The center of the first is set at a distance of equal to the turning radius away from the point perpendicular to the specified direction in the direction of the first turn. The second turn is then in the opposite direction as the direction of the first turn and its center is calculated as the intercept of a circle with the same center as the first turn but twice the radius and a second line. When joining the part of the path that is straight FIG. 20(a)) the second line is a line plotted parallel to the driven path at an offset of the turning radius perpendicular to the driven path in the direction of the second turn. When joining the part of the path that is an arced line in the same direction as the first turn (FIG. 20(b)) the second line is an arced line with the same center as the driven path arced line, but with a radius that is twice as large. When joining the part of the path that is an arced line in the opposite direction as the first turn (FIG. 20(c)) the second line is in fact a point corresponding to the center of rotation of the arced line.

The third type of connection is very similar to the first type of connection; however, the first straight line is allowed to go in the opposite direction of the specified direction, i.e., the vehicle reverses.

The third type of connection is deprioritized, as reversing in the field can cause additional problems, such as taking more time or causing damage, therefore, if a type 1 connection or type 2 connection can be made between a working row driven path and a headland, then a type 3 connection is not attempted.

Figure 21:
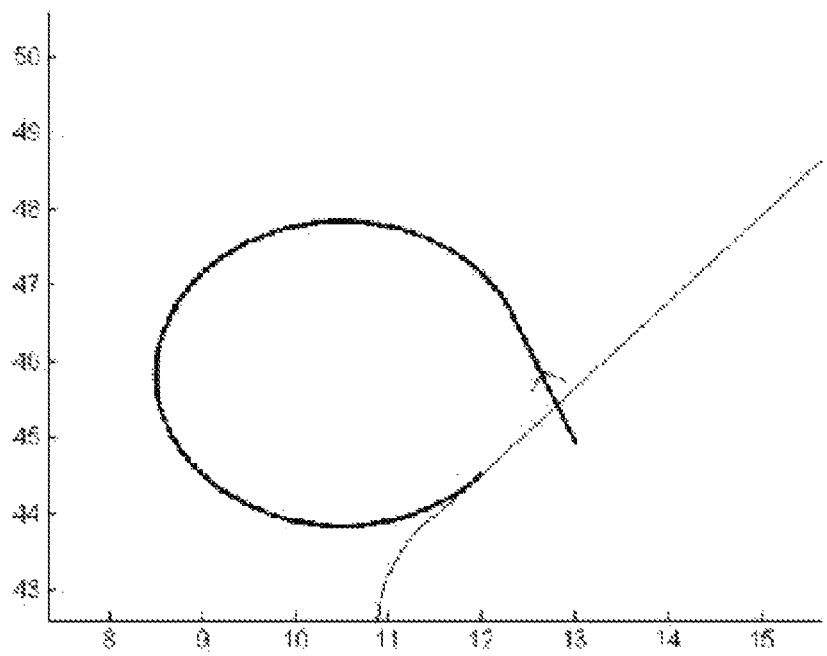
Figure 21:
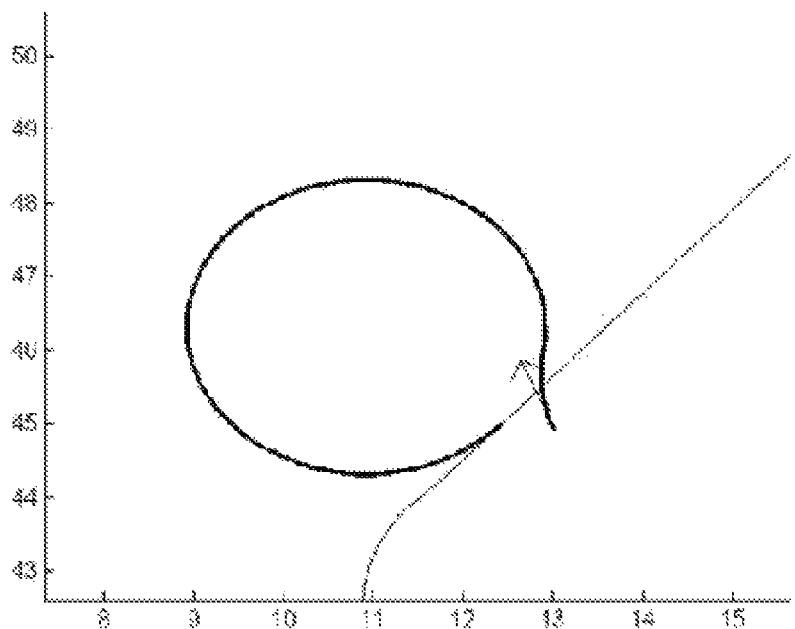
Figure 21:
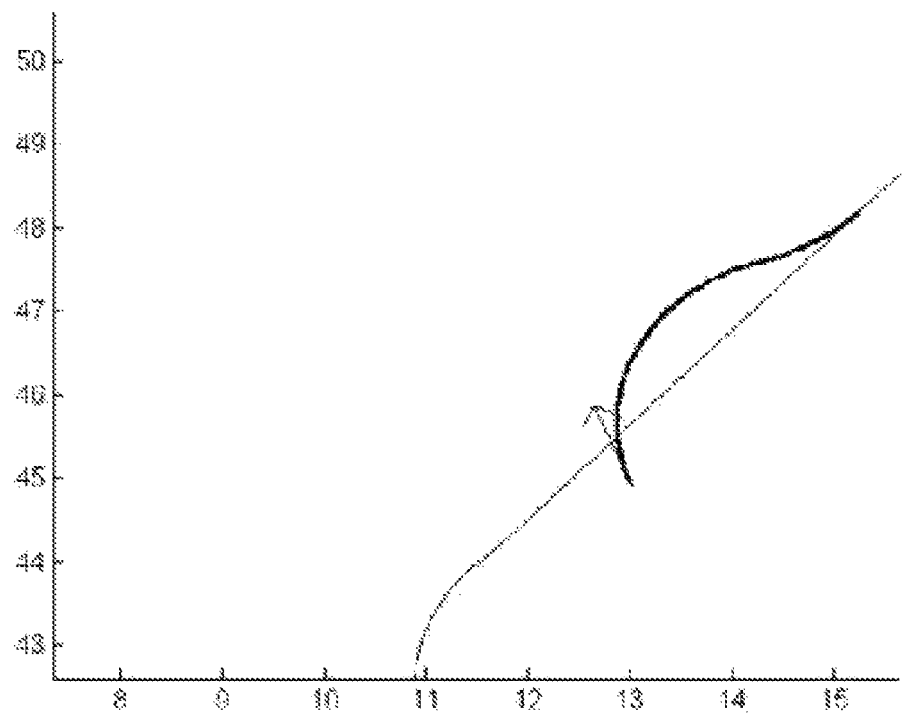

Described earlier, $\stackrel{1}{d}EDR_+^1=[13.0144.93]$, is an exit from a working row driven path that needs to join a headland driven path. Using the headland driven path also described earlier it is possible to make three connections between the working row driven path and the headland driven path, see FIGS. 21(a)-21(c). FIG. 21(a) is a type 1 connection, while FIGS. 21(b) and 21(c) are type 2 connections.

The three paths are full described in the Table 4 below.

TABLE 4

| i | Start point (sp$_i$) | Start direction (sd$_i$) | Length (l$_i$) | Centre of Rotation (cr$_i$) |
|---|---|---|---|---|
| | | a | | |
| 1 | [13.01, 44.93] | [−0.37, 0.93] | 1.77 | ~ |
| 2 | [12.36, 46.57] | [−0.37, 0.93] | 10.36 | [10.50, 45.83] |
| | | b | | |
| 1 | [13.01, 44.93] | [−0.37, 0.93] | 1.08 | [14.87, 45.67] |
| 2 | [12.90, 45.99] | [0.16, 0.99] | 11.44 | [10.92, 46.31] |
| | | c | | |
| 1 | [13.01, 44.93] | [−0.37, 0.93] | 3.34 | [14.87, 45.67] |
| 2 | [14.31, 47.59] | [0.96, 0.28] | 1.02 | [13.76, 49.51] |

The connections from the headland driven paths to the working row driven paths starts are calculated in exactly the same way; however, the specified direction and the headland driven paths are first reversed, the connections are then calculated and finally the connections are reversed.

Figure 23A:
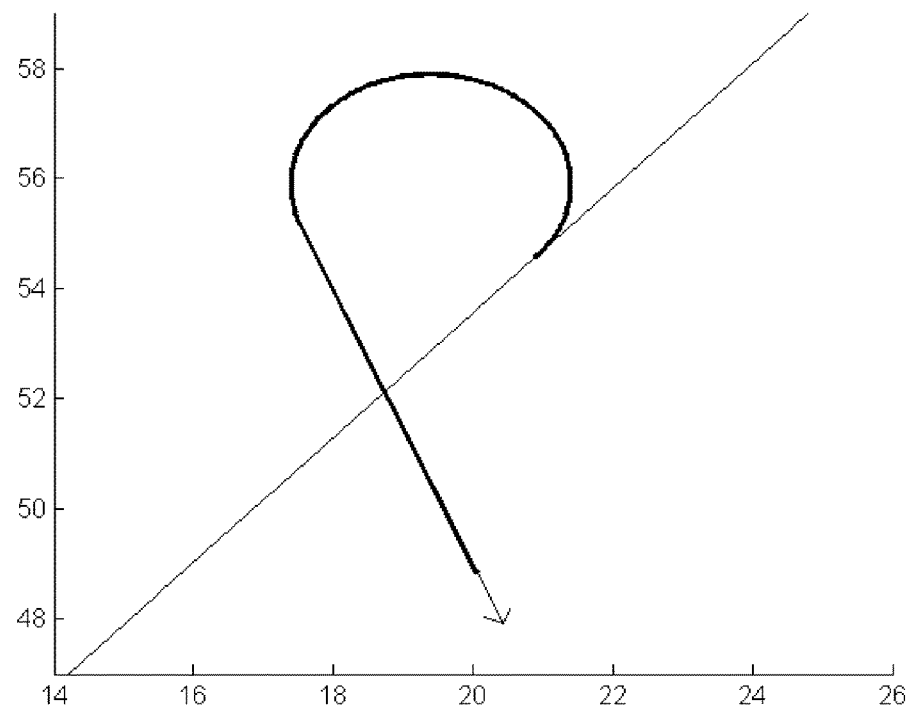
Figure 23B:
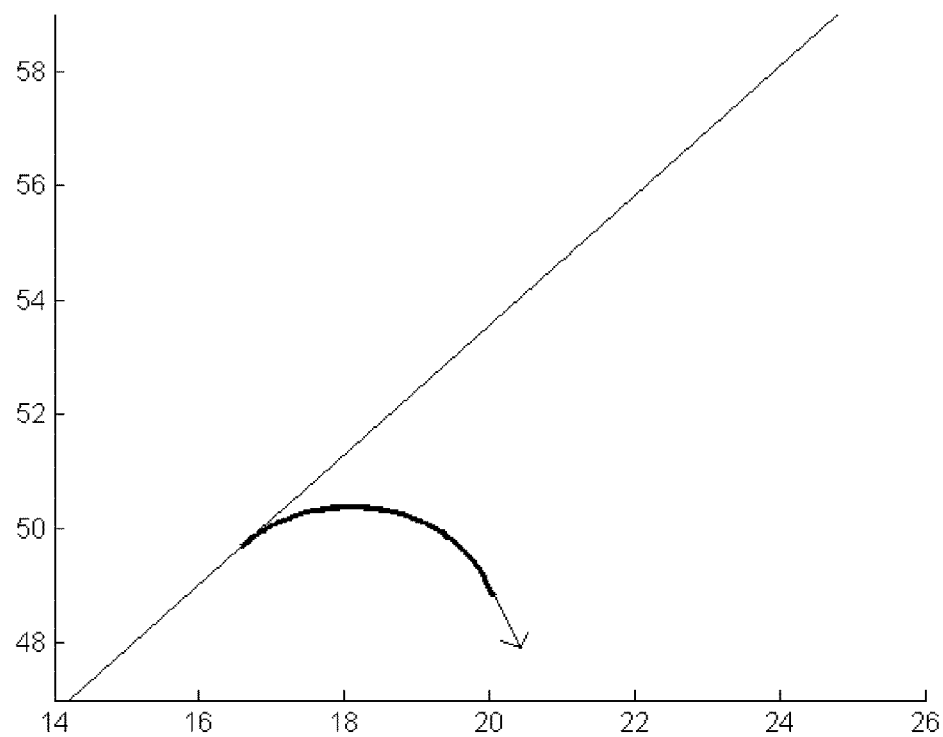
Figure 23C:
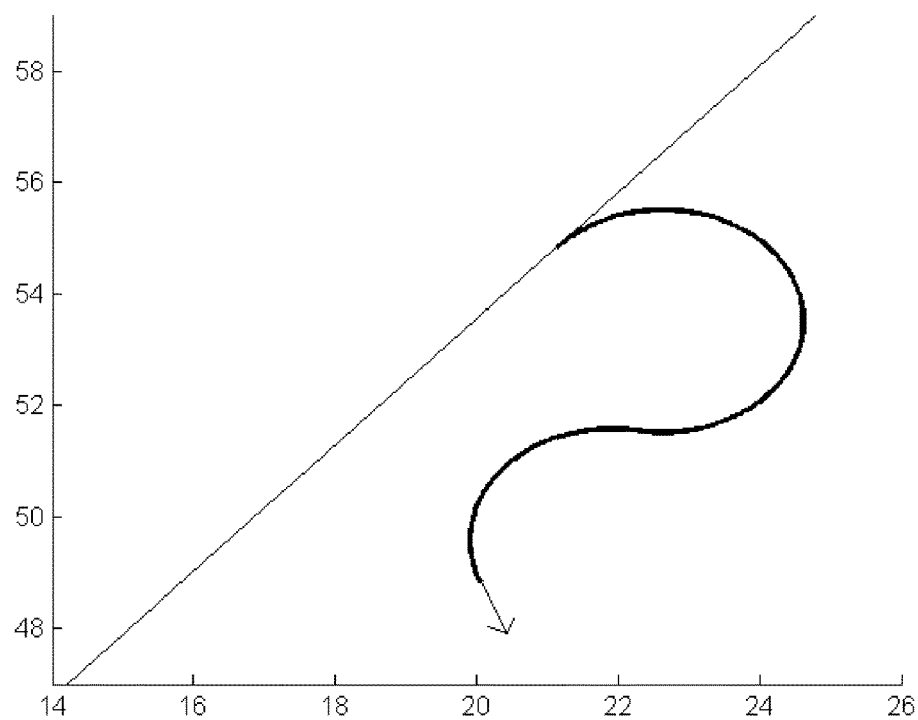
Figure 23D:
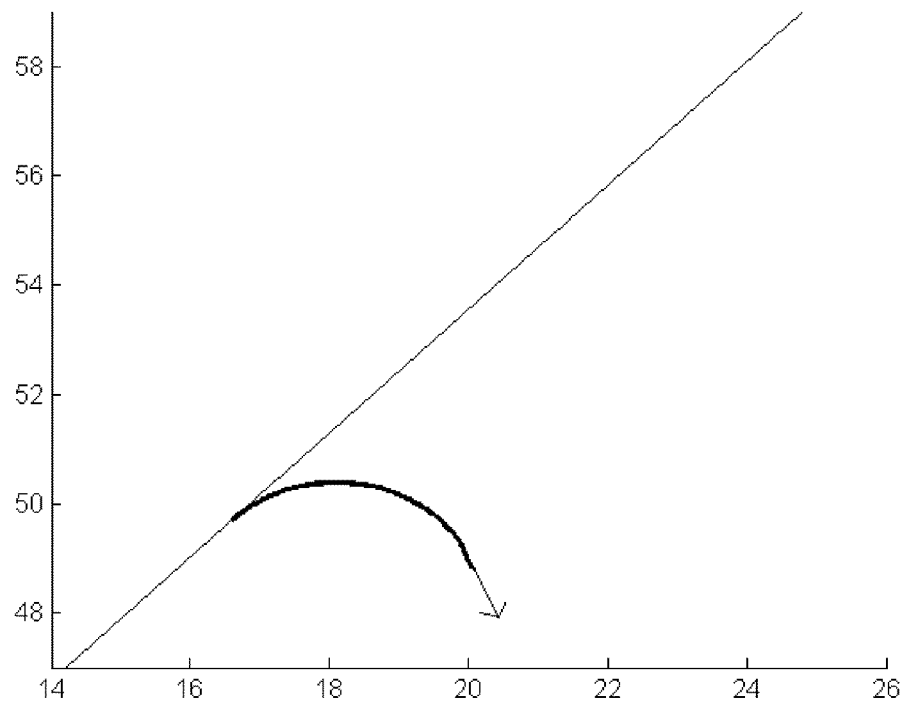

Another working row is defined at a distance of two times the working width, in the direction perpendicular the driving direction, from the originally defined working row. It has two driven paths, as explained earlier, with one of its driven paths beginning at $\stackrel{1}{d}SDR\_^1=[20.0648.84]$. There are four possible connections between the headland driven path and the working row driven path, see FIGS. 23 (a)-23(d). FIGS. 23(a) and 23(b) are type 1 connections while FIGS. 23(c) and 23(d) are type 2 connections.

The paths are also described in the Table 5 below.

TABLE 5

| i | Start point ($sp_i$) | Start direction ($sd_i$) | Length ($l_i$) | Centre of Rotation ($cr_i$) |
|---|---|---|---|---|
| a |  |  |  |  |
| 1 | [20.89, 54.57] | [0.66, 0.75] | 8.5 | [19.39, 55.89] |
| 2 | [17.53, 55.15] | [0.37, −0.93] | 6.8 | ~ |
| b |  |  |  |  |
| 1 | [16.59, 49.70] | [0.66, 0.75] | 4.08 | [18.09, 48.38] |
| 2 | [19.95, 49.12] | [0.37, −0.93] | 0.6 | ~ |
| c |  |  |  |  |
| 1 | [21.13, 54.84] | [0.66, 0.75] | 8.34 | [22.63, 53.52] |
| 2 | [22.27, 51.55] | [0.98, −0.18] | 4.26 | [21.92, 49.58] |
| d |  |  |  |  |
| 1 | [16.60, 49.71] | [0.66, 0.75] | 4.22 | [18.10, 48.39] |
| 2 | [20.01, 48.99] | [−0.30, 0.95] | 0.16 | [21.92, 49.58] |

The field gates are also connected to, and from, the headland driven paths in the same way.

Cost Matrix

The connection from one working row driven path to another can be found if the first working row driven path connects to a specified headland driven path and the specified headland driven path also connects to the second working row driven path. In this way, upon leaving the first working row driven path the vehicle can follow the specified headland driven path until it is able to enter the second working row driven path. Since there are multiple ways for each working row driven path to connect to, and to be connected to from, each headland driven path and since there is the possible of multiple headland driven paths, there are many ways in which two working row driven paths can be connected.

A cost matrix is built up of the minimal distance to connect two working row driven path, the field gates are also included in this cost matrix. The ends of the working row driven paths are not able to connect to themselves; therefore, the minimal distance between them is set to infinity. In addition, two working row driven paths that cover the same working row are not able to be connected (this would not make sense since it would mean the working row was worked twice), therefore their connection in the cost matrix is also set to infinity.

The two working row driven path ends, whose connections were described earlier, are $\mathring{\partial}EDR_+^1$ and $\mathring{\partial}SDR_-^1$. Both of these ends connect to and from, respectively, the same headland driven path; therefore, they can be connected. Fitting the turns together, going from one working row driven path end along the headland driven path and then into another working row driven path, can be done a number of ways. Since there are three connections from $\mathring{\partial}EDR_+^1$ to the headland driven path and there are four connections from the headland driven path to $\mathring{\partial}SDR_-^1$, then there are twelve possible connections between the two working row driven paths. Table 6 below describes the lengths of all of the possible connections.

TABLE 6

|  |  | $^1EDR_+^1$ | | |
|---|---|---|---|---|
|  |  | a | b | c |
| $^3SDR_-^1$ | a | 40.84 | 40.60 | 28.26 |
|  | b | 23.44 | 23.19 | 10.86 |

TABLE 6-continued

|  |  | $^1EDR_+^1$ | | |
|---|---|---|---|---|
|  |  | a | b | c |
|  | c | 38.52 | 38.27 | 25.94 |
|  | d | 23.46 | 23.21 | 10.88 |

Figure 22:
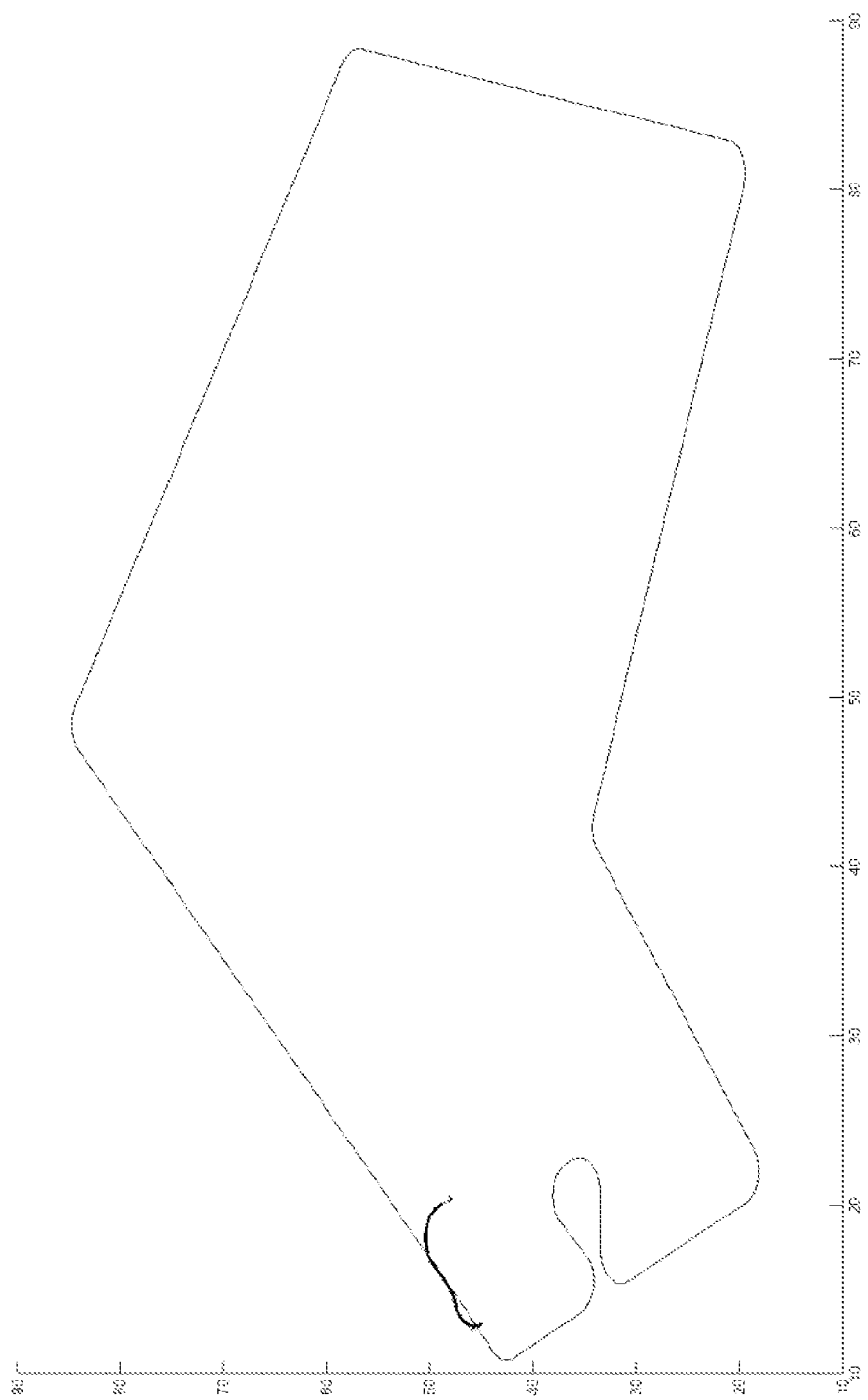

As can be seen from Table 6, the shortest connection from $\mathring{\partial}EDR_+^1$ to $\mathring{\partial}SDR_-^1$ is by using connection c and then connection b. The path of the connection is shown in FIG. 22 and described in Table 7 below.

TABLE 7

| i | Start point ($sp_i$) | Start direction ($sd_i$) | Length ($l_i$) | Centre of Rotation ($cr_i$) |
|---|---|---|---|---|
| 1 | [13.01, 44.93] | [−0.37, 0.93] | 1.08 | [14.87, 45.67] |
| 2 | [12.90, 45.99] | [0.16, 0.99] | 11.44 | [10.92, 46.31] |
| 3 | [15.25, 48.19] | [0.66, 0.75] | 2.02 | ~ |
| 4 | [16.59, 49.70] | [0.66, 0.75] | 4.08 | [18.09, 48.38] |
| 5 | [19.95, 49.12] | [0.37, −0.93] | 0.6 | ~ |

The cost matrix for a portion of the field is chosen below.

|  | $\mathring{\partial}DR_+^1$ | $\mathring{\partial}DR_-^1$ | $\mathring{\partial}DR_+^1$ | $\mathring{\partial}DR_-^1$ | $\mathring{\partial}DR_+^1$ | $\mathring{\partial}DR_-^1$ | $G^1$ |
|---|---|---|---|---|---|---|---|
| $^1DR_+^1$ | ~ | ~ | 50.59 | 10.86 | 43.62 | 17.59 | 18.98 |
| $^1DR_-^1$ | ~ | ~ | 28.57 | 27.12 | 25.94 | 33.84 | 19.54 |
| $^3DR_+^1$ | 26.08 | 18.43 | ~ | ~ | 36.90 | 10.87 | 32.05 |
| $^3DR_-^1$ | 45.72 | 45.41 | ~ | ~ | 17.98 | 44.95 | 199.93 |
| $^5DR_+^1$ | 32.79 | 18.02 | 46.91 | 18.43 | ~ | ~ | 54.24 |
| $^5DR_-^1$ | 52.06 | 51.75 | 11.09 | 46.09 | ~ | ~ | 75.76 |
| $G^1$ | 18.72 | 18.41 | 235.60 | 28.25 | 76.01 | 49.97 | ~ |

The cost matrix can be used to determine a feasible route to navigate the field. Since the problem to find the optimal route to navigate the field can be considered an NP-hard problem (i.e., it may not be possible to find a solution in a nominal time frame), the heuristic solvers can be used to find a near optimal route. The solver must also account for the fact working row driven paths are associated to one another by the working row they cover.

In this example, a greedy heuristic method is used to find a route to navigate the field. This method provides a simple estimate of what the optimal solution might be. However, different solvers could be used, such as a tabu search solver, ant colony solver, genetic algorithms, etc., to give similar results.

Firstly a starting gate is chosen. The gate is chosen by considering all the connections from gates to the working row driven paths. The connections to the working row driven paths are in the rows labelled for each gate. The gate that has the shortest connection to any working row driven path is chosen as the starting gate and the working row driven path is chosen as the first working row driven path in the route. Since this working row driven path has been chosen as a "destination," it cannot be chosen as a destination from another working row driven path again; therefore, all the values in the column associated with it are set to infinity. Also, the other working row driven path associated with the same working row cannot be chosen, either as a destination or a start so all of the values in both the column and the row associated with the other working row driven path are also set to infinity.

The first working row driven path is now considered the start point and shortest connection from it to another working row driven path is now sought after. The shortest connection is that in the row associated with the first working row driven path with the lowest value. The working row driven path with the lowest value is considered the second working row driven path in the route. Again, all of the values in the column associated with the second working row driven path and that of the working row driven path associated with the same working row are set to infinity as is the row of values of the working row driven path associated with the same working row. This method continues until only the gates remain as possible destinations. The sum of all of the chosen connections is the estimation of the non-working distance needed to navigate the field.

Additionally a further heuristic solver could be used to improve upon the solution offered by the greedy solution and to find a solution nearer to the optimal solution. The tabu search method takes and initial solution and manipulates it with the aim to find better global solutions without becoming "locked in" to locally optimal solutions.

The tabu search is setup by setting an initial solution to the current local solution and the global solution. The iterative process then begins and a number of "moves" are used to determine a local neighborhood of solutions around the local solution. The moves used could be switching the direction of a row, or changing the entrance or exit, or switching the order of two rows adjacent in the solution.

From the generated neighborhood of solutions the best new, non-tabu, solutions is chosen. This new solution now becomes the local solution for the next iteration. The move used to generate the new solution is set to be tabu for a number of iterations, meaning the same move will not be used again for some time. This stops the local solution from becoming stagnant and increases the diversity of the algorithm while also helping to find a globally optimal solution. If the new solution is better than the current global solution then the new solution is also set as the global solution. If the new solution is not better than the global solution for a number of iterations the moves are intensified to find different solutions. The intensification alter the moves differently such that small groups of rows adjacent in the solution have the move expressed upon rather than one row at a time. Due to this there is a limit to the amount of intensification that can be applied to the moves, i.e., if the small group of rows is over half of the available rows. As such when the limit of the intensification is reached the tabu search is finished and an improved solution is returned.

Objective Function Parameterization

To relate the estimation of the non-working distance, ENWD, to basic properties of the field a simplified model was developed.

Figure 9:
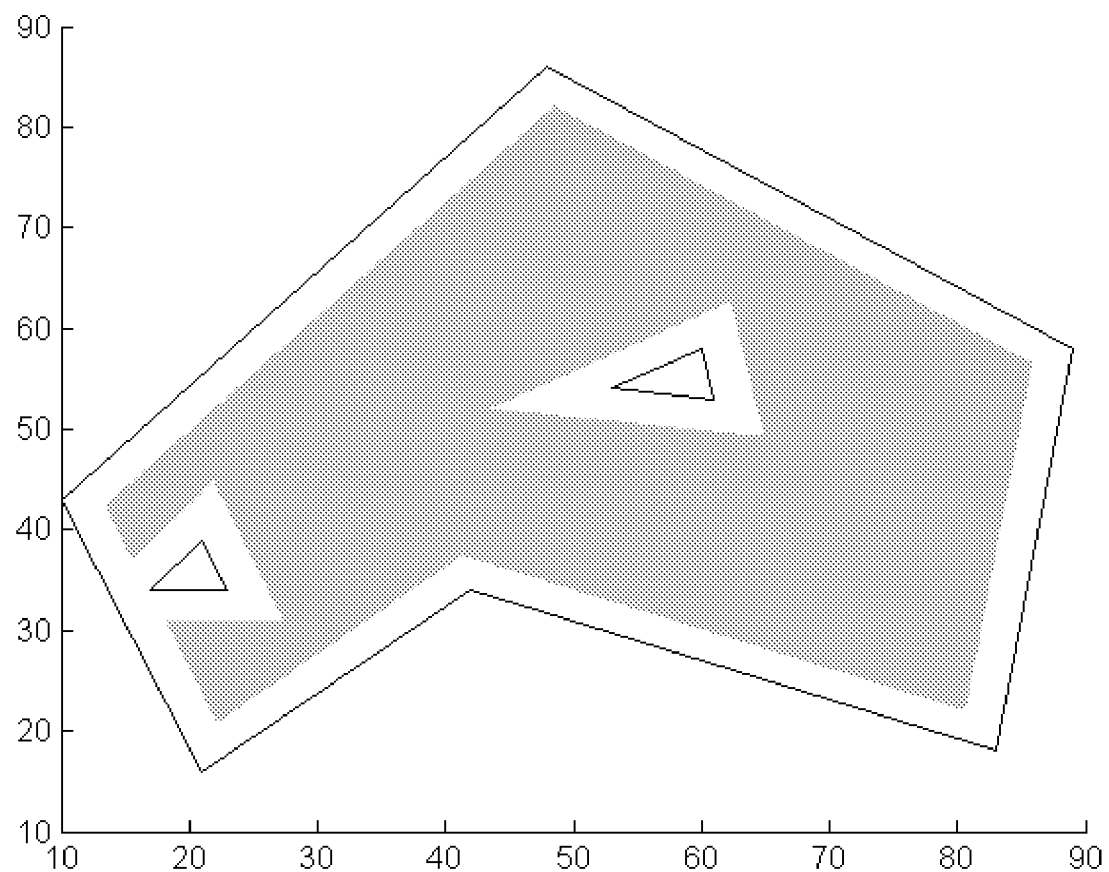

The set of generated working rows are calculated using the previously defined methods. For each possible driving direction of the field, where $DD=D_d$, the produced set of working rows are assessed on the following criteria:

Area of the working area, as shown in FIG. 9 = WA

Number of rows = $NR_d$ = number of $WR$ for $D_d$

Total area of rows = $TWRA_d = \sum_{i=0}^{n} \square \text{ area of } WR^i$

Width of the area if the direction perpendicular to the driving direction = $OW_d = \max\{DD^\perp \circ P_j\}_j - \min\{DD^\perp \circ P_j\}_j$.

-continued

Average row length = $AR_d =$ $$\frac{1}{NR}\sum_{i=0}^{n} \max\left\{DD\circ\left(\overset{i}{\square}RCA_j^k - L_1^i\right)\right\}_j - \min\left\{DD\circ\left(\overset{i}{\square}RCA_j^k - L_1^i\right)\right\}_j$$

Longest row length = $LR_d =$ $$\max\left\{\max\left\{DD\circ\left(\overset{i}{\square}RCA_j^k - L_1^i\right)\right\}_j - \min\left\{DD\circ\left(\overset{i}{\square}RCA_j^k - L_1^i\right)\right\}_j\right\}_i$$

Shortest row length =

$$SR_d = \min\left\{\max\left\{DD\circ\left(\overset{i}{\square}RCA_j^k - L_1^i\right)\right\}_j - \min\left\{DD\circ\left(\overset{i}{\square}RCA_j^k - L_1^i\right)\right\}_j\right\}_i$$

The number of rows produced by each driving direction ($NR_d$) are ranked, $NRR_d$, so that for the set with the least number of rows $NRR_d=0$, and for the set with the most number of rows $NRR_d$=number of possible driving directions. NRR is then normalized by dividing each number by the number of possible driving directions so that $0 \leq NRR_d \leq 1$.

Therefore, the basic model for predicting ENWD is as follows:

$$ENWD_d = \lambda_1 WA + \lambda_2 NR_d + \lambda_3 TWRA_d + \lambda_4 OW + \lambda_5 AR_d + \lambda_6 LR_d + \lambda_7 SR_d + \lambda_8 NRR_d$$

Optimal $DD = \min\{ENWD_d\}_d$

Parameterization of the Objective Function

The parameters of the objective function are set empirically by testing numerous driving directions on a large set of real fields. The real fields were taken from the set of Danish fields registered with the government. For each field and driving direction an estimation of the optimal non-working distance was made using the described methods, the parameter of the objective function area also calculated. Finally a regression algorithm is used to determine the parameterization of the objective function.

Example 2

This example illustrates the present disclosure. This example illustrates in a very simplified and idealized way how the disclosure is to be conducted.

In this example, an agricultural field comprising a number of obstacles needs to be worked by an agricultural working vehicle or implement.

Figure 24:
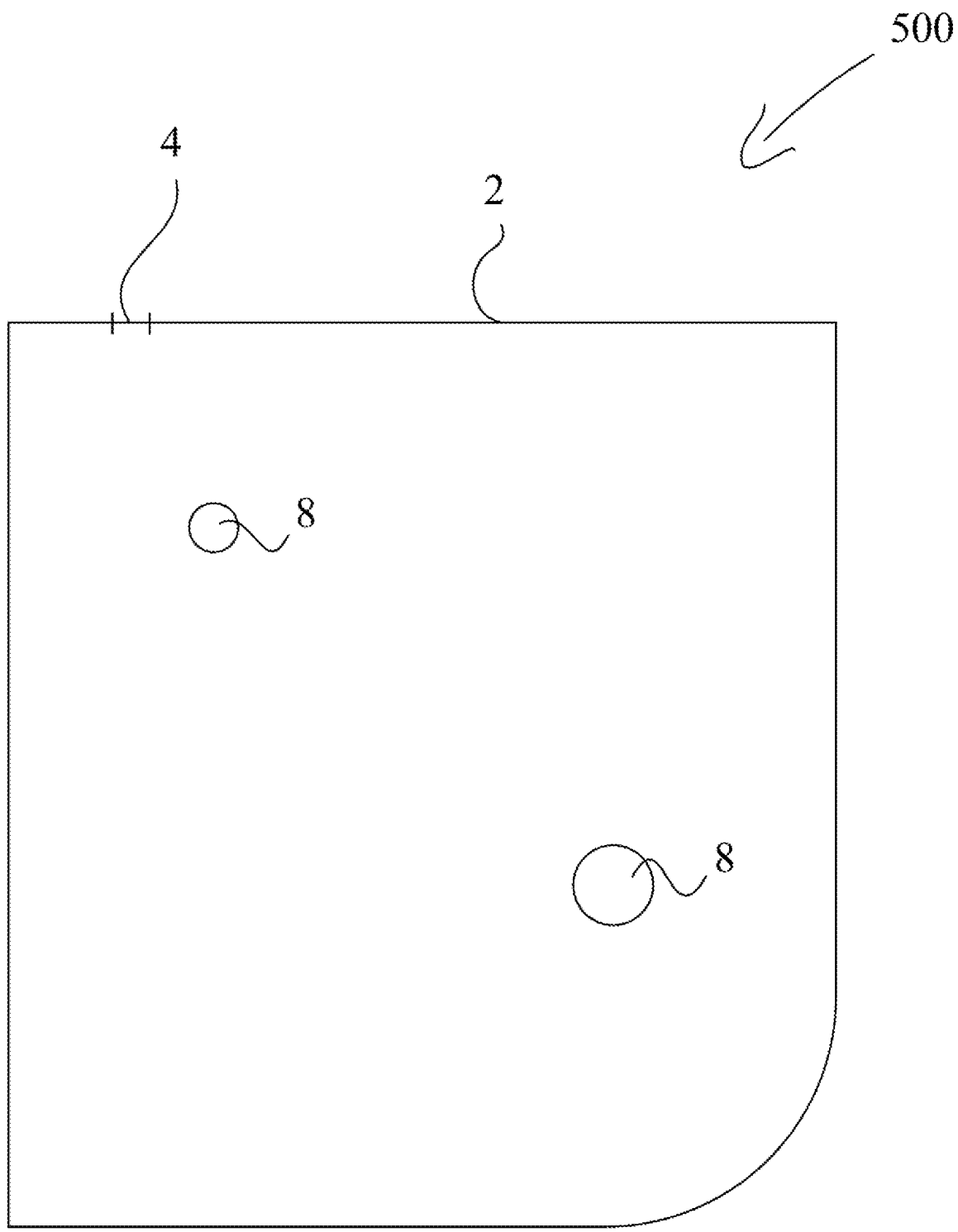
FIGS. 24-29 illustrate the individual steps associated with performing one embodiment of the method according to the present disclosure.

FIG. 24 illustrates the field to work. The field 500 is constrained within a field boundary 2. At a specific location on the field boundary 2 an entrance/exit gate 4 is located.

The field boundary comprises two pairs of parallel lines. In the lower right corner of the field shown in FIG. 24 two perpendicular boundary lines are connected by a circular path.

Within the field boundary 2, two obstacles 8, which obviously must be avoided when working the field, are located.

First, the field boundary 2 is approximated to the shape of a polygon. This is illustrated in FIG. 25.

Figure 25:
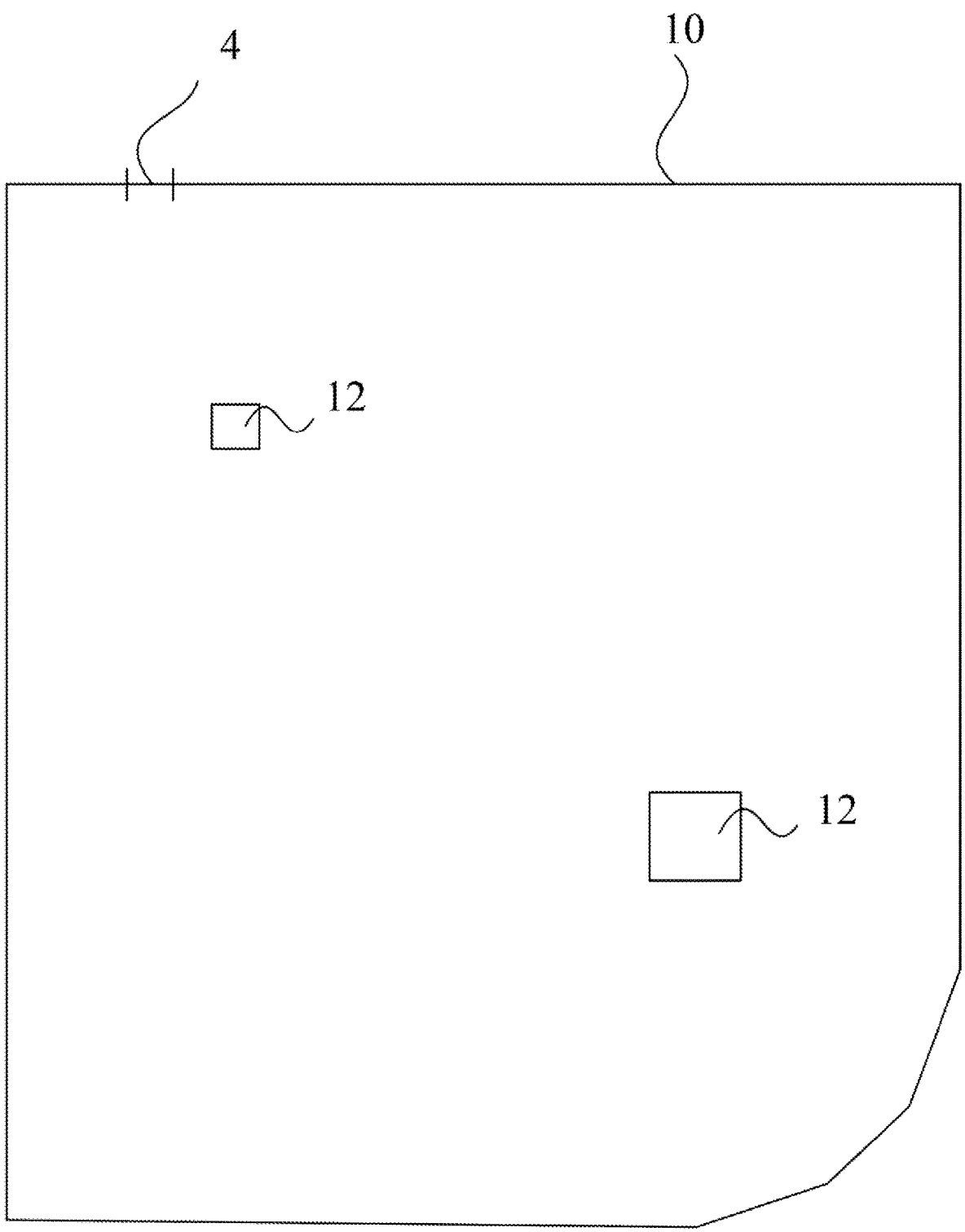

FIG. 25 shows that the field boundary 2 of FIG. 24 has been approximated to a polygon. This polygon is defined as the boundary polygon 10. It is seen that the original circular path in the lower right corner of the field has been exchanged with three linear segments.

Also, each of the obstacles 8 have been approximated to an obstacle polygon 12. The shape of the obstacle polygon corresponds to a square encompassing the shape of obstacle 8 itself.

Figure 26:
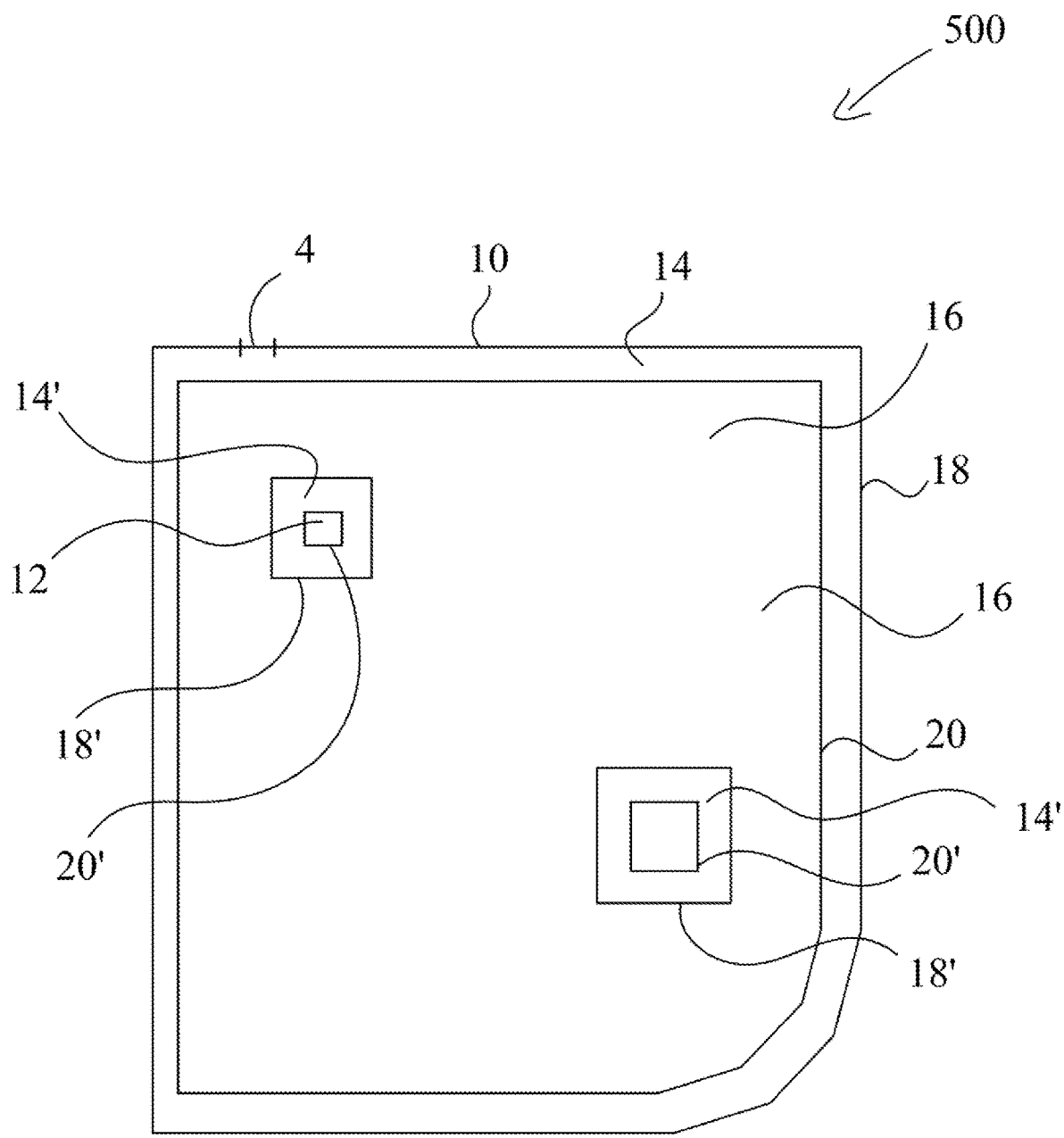

The next step in the method is to define a work area and one or more headlands. This is illustrated in FIG. 26. In FIG. 26, a headland 14 is defined immediately within the boundary polygon 10. The headland 14 is having a width corresponding to the effective working width of the working implement. Accordingly, the headland 14 is having an outer periphery 18 corresponding to the boundary polygon 10. Further, the headland 14 defines an inner periphery 20 arranged at a distance corresponding to an effective working width from the outer periphery 18.

Additionally, a headland 14' is defined around each of the obstacle polygons 12. The headland 14' is constrained within an outer periphery 18' and an inner periphery 20' of the headland 14'.

The area of the field 500 that is not a headland 14, 14' and that is not an obstacle 8 is defined as the work area 16.

It is seen in FIG. 26, the polymer approximation of the boundary polygon and the obstacle polygon comprises 15 different linear segments (seven in respect of the boundary polygon and four in respect of each of the obstacle polygons 12).

As some of these 15 different linear segments are parallel, these 15 different linear segments define a total of five different orientations of linear segments (five in respect of the boundary polygon and zero in respect of the obstacle polygon (or alternatively, two in respect of each the obstacle polygon and three in respect of the boundary polygon)).

In the next step we wish to create, within the work area, an array of possible work rows to be followed by the working vehicle. For the sake of simplicity we wish the possible work rows to be parallel to a side of a boundary polygon or of an obstacle polygon (or a headland thereof). In the present example, it is desired that the working rows have a width corresponding to the effective working width of the implement intended to work the field.

Accordingly, in the present example, the working rows of the mainland may be oriented in five different orientations.

Figure 27:
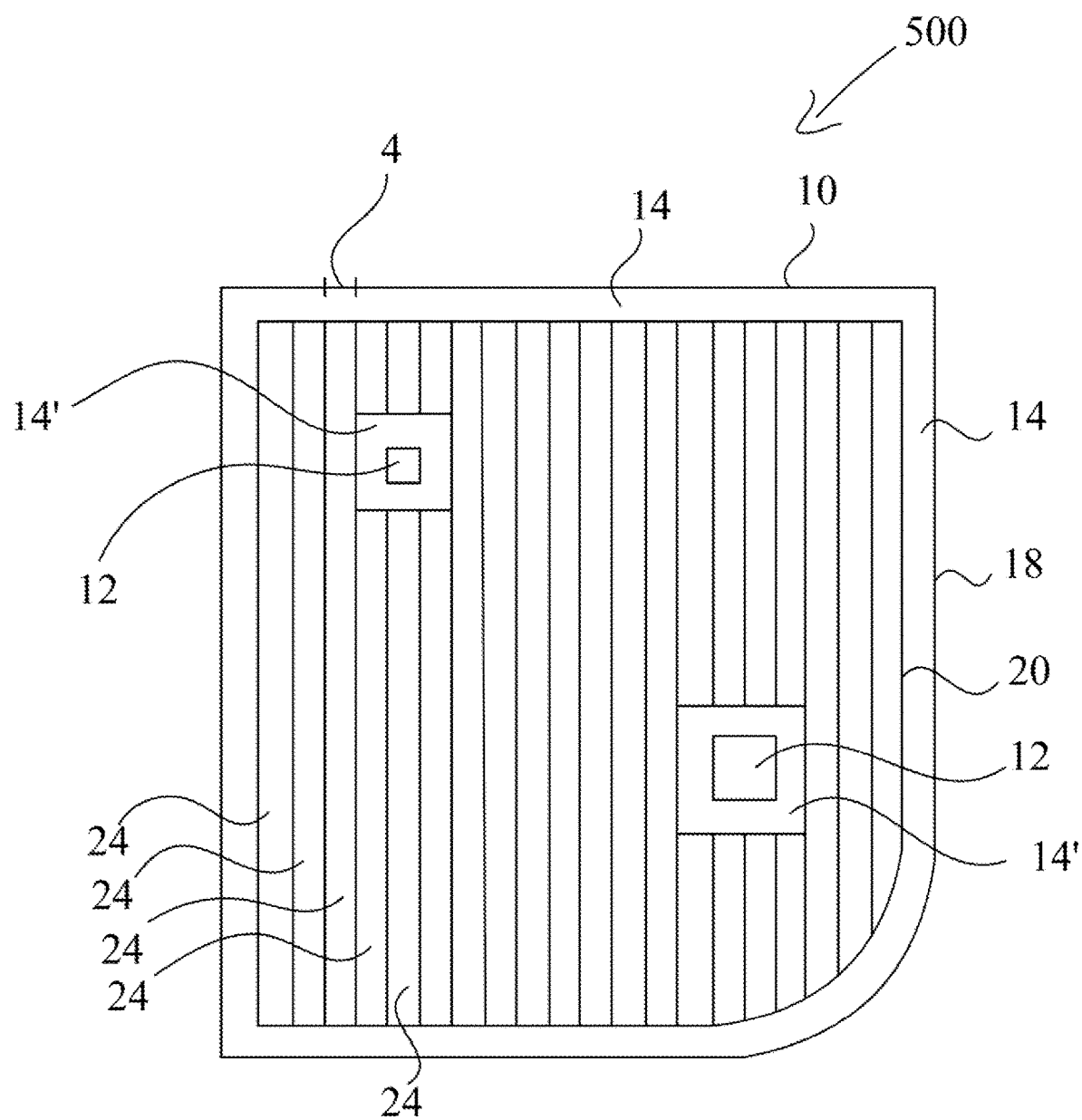

FIG. 27 illustrates one example of defining an array of possible working rows. In FIG. 27, it is shown that the working rows 24 are all oriented parallel to the left linear segment of the boundary polygon 10.

Figure 28:
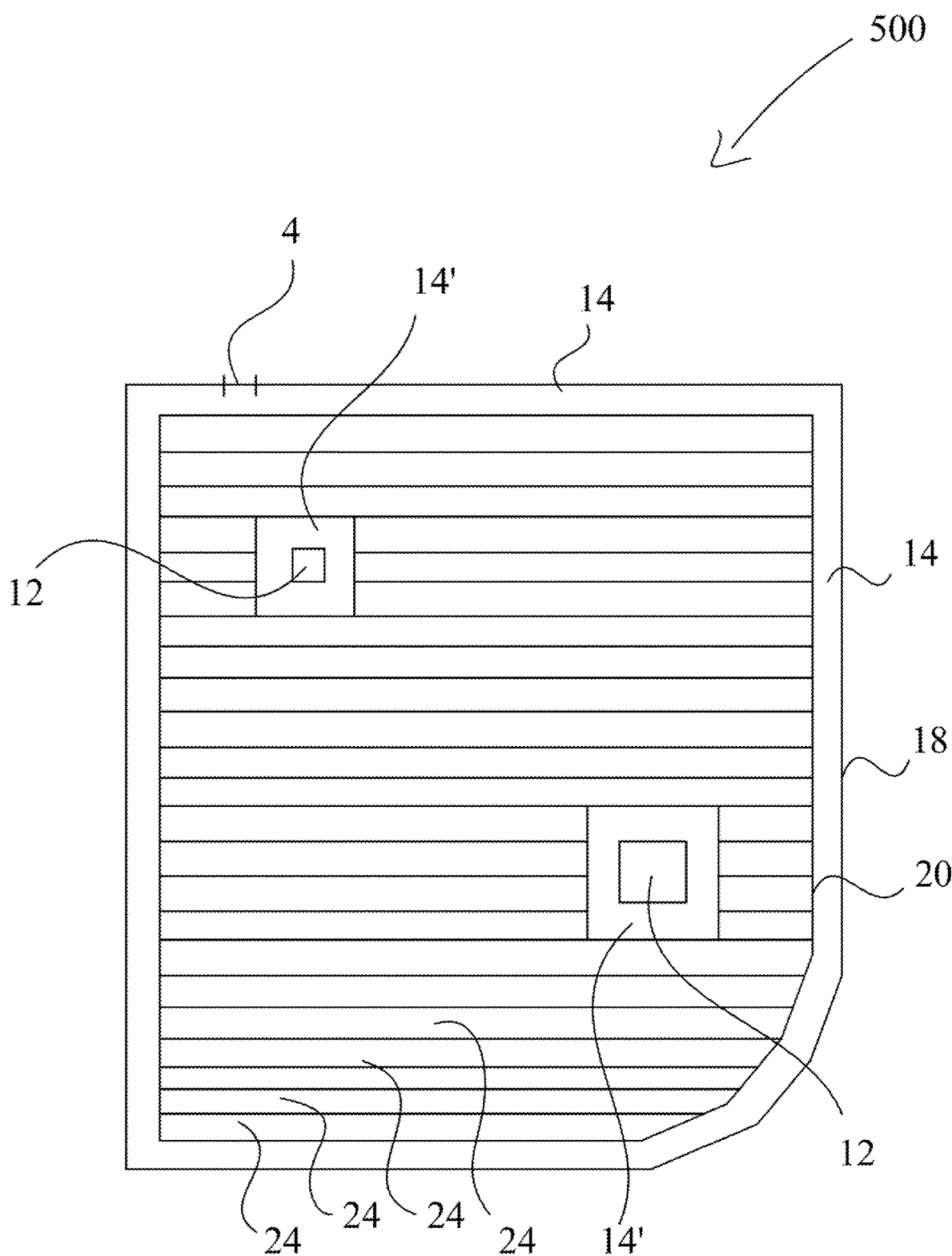

Another example of a definition of an array of possible working rows is shown in FIG. 28. FIG. 28 shows that the working rows 24 are all oriented parallel to the lower linear segment of the boundary polygon 10.

Likewise, similar arrays of possible working rows will be defined in respect of the remaining three of the five possible orientations, which are parallel to a field boundary or to an obstacle boundary.

In this example, the further steps are only illustrated with reference to the working rows defined as shown in FIG. 27.

The next step of the method is to connect in a number of possible ways working rows with headlands so as result in an array of possible continuous driving path for working the field in such a way that each work row and each headland will be worked.

Figure 29:
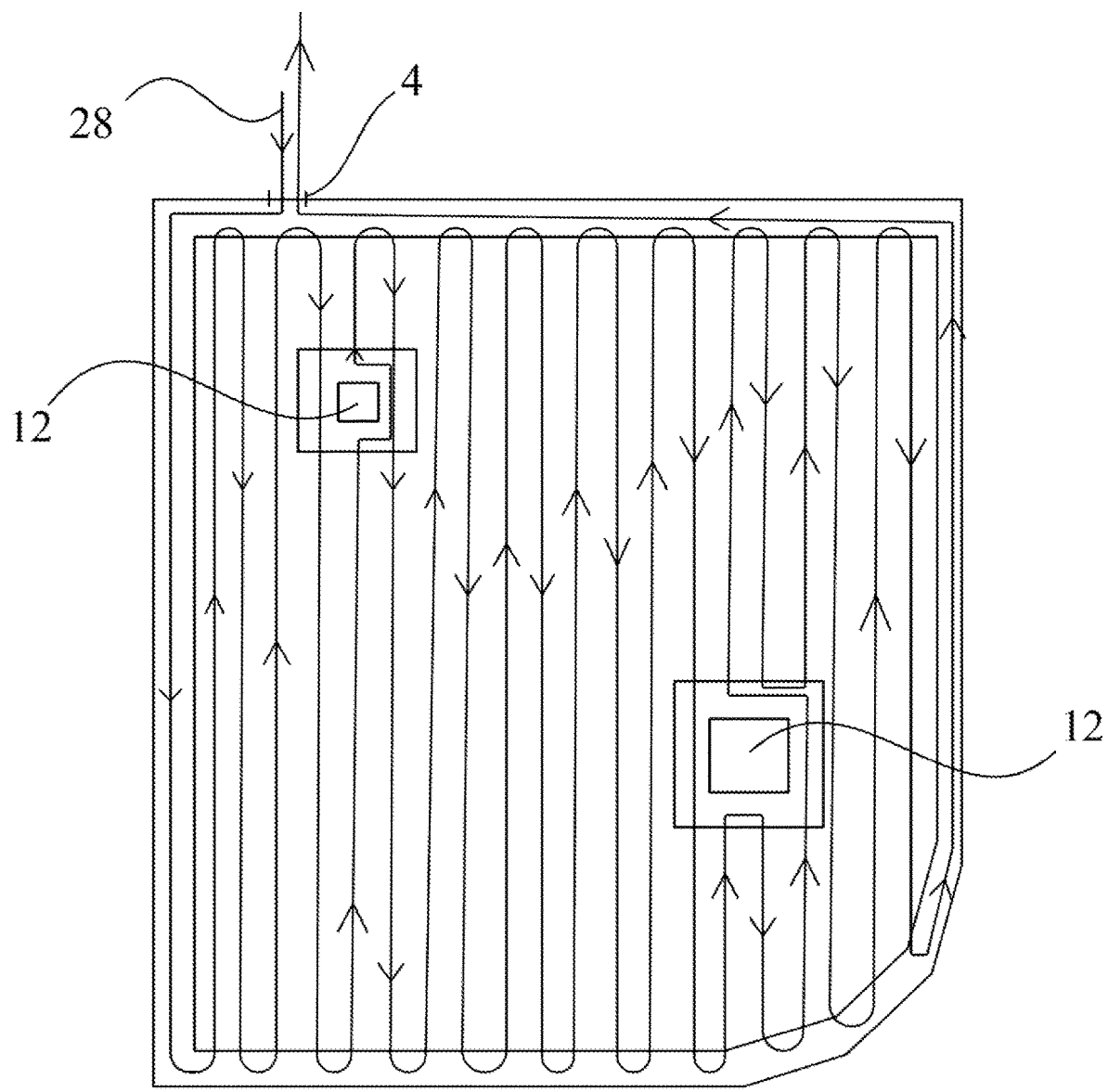

One example of possible continuous driving path defined in respect of the orientation of the working rows as illustrated in FIG. 29.

In respect of each such possible continuous driving path in the array of possible continuous driving paths as defined in respect of each possible orientation of working rows, a cost parameter may be defined and the total cost of following each possible continuous driving path can be calculated.

The optimized driving path to follow will be that driving path exhibiting the lowest total cost.

One cost parameter may be total area travelled twice or more. In the present example it is seen that the only areas travelled twice or more are part of the headlands surrounding the obstacles and the upper headland of the field.

Accordingly, the path 28 illustrated in FIG. 29 may pose a good candidate for an optimized trajectory to follow by the working vehicle or implement. However, only by calculating the total cost in respect of a huge amount of possible continuous paths, it will be possible to find the most efficient trajectory to follow.

Figure 30:
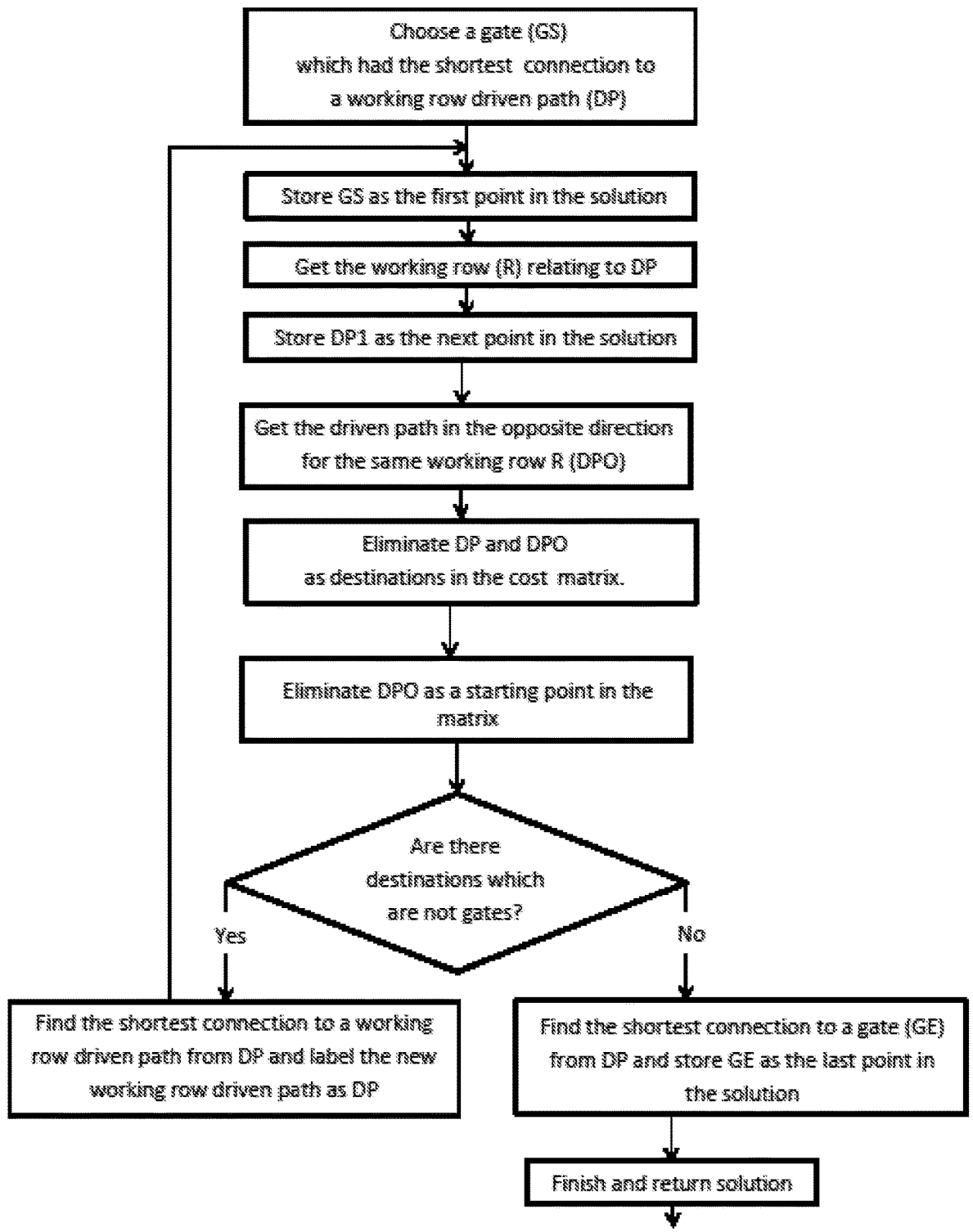
FIG. 30 is a flow diagram illustrating an iterative procedure for use in one embodiment of the method according to the present disclosure.

The flow diagram shown in FIG. 30 illustrates one example of the individual process steps to be followed in finding an optimized trajectory prior to working an agricultural cultural field comprising a number of obstacles.

The disclosure may be further explained with reference to the items 1-34 below:

Item 1: A support system (100) for determining a trajectory to be followed by an agricultural work vehicle, when working a field, the system comprising:
  a mapping unit configured for receiving:
    i) coordinates relating to the boundaries of a field to be worked; and
    ii) coordinates relating to the boundaries of one or more obstacles to be avoided by the work vehicle; wherein the one or more obstacles being located within the field;
  a capacity parameter unit configured for receiving one or more capacity parameters relating to the working vehicle;
  a trajectory calculating unit configured for calculating an optimized trajectory to be followed by the work vehicle; wherein the optimized trajectory is being calculated on the basis of the coordinates received by the mapping unit; and one or more of the one or more capacity parameters received by the capacity parameter unit.

Item 2: A support system (100) according to item 1, wherein the mapping unit furthermore is configured for receiving:
  iii) coordinates relating to the possible entrance/exit gates of the field.

Item 3: A support system (100) according to item 1 or 2, wherein the optimized trajectory is an optimized trajectory in terms of total operational time for working the field; total productive time for working the field; total fuel consumption for working the field; total non-working distance for working the field; total distance travelled twice or more; total distance travelled through crops; total area cover twice or more.

Item 4: A support system (100) according to any of the items 1-3, wherein the one or more capacity parameters being selected from the group comprises: effective working width of the work vehicle or the working implement, load of work vehicle as a function of distance travelled, fuel consumption as a function of distance travelled, and minimum turning radius of vehicle or implement or both.

Item 5: A support system (100) according to any of the items 1-4 further comprising a display unit configured to be able to show on a map of the field, the optimized trajectory to be followed by the work vehicle as calculated by the trajectory calculating unit.

Item 6: A support system (100) according to any of the items 1-5, wherein the mapping unit is being configured for storing, in respect of one or more specific fields, one or more of:
  i) coordinates relating to the boundaries of the one or more specific fields;

ii) coordinates relating to the boundaries of one or more obstacles being located within the one or more specific fields; and iii) coordinates relating to the possible entrance/exit gates of the one or more specific fields.

Item 7: A support system (100) according to any of the items 1-6, wherein the trajectory calculating unit is configured to calculate an optimized trajectory analytically or numerically.

Item 8. A support system (100) according to item any of the preceding items, wherein the trajectory calculating unit is being configured to find a number of candidate trajectories, and wherein the trajectory calculating unit is configured to calculate, in respect of each candidate trajectory, an efficiency parameter, and wherein the trajectory calculating unit is configured to suggest to the user, that specific candidate trajectory, which exhibits the highest efficiency parameter.

Item 9: A support system (100) according to item any of the preceding items, wherein the trajectory calculating unit is being configured to perform the following steps:
a) approximating the coordinates relating to the boundaries of the field to be worked to a boundary polygon; and wherein the support system is being configured to determine the trajectory to be followed, based on that approximation;
b) approximating the coordinates relating to the boundaries of each of the one or more obstacles, to respective obstacle polygons; and wherein the support system is being configured to determine the trajectory to be followed, based on that approximation;
c) defining one or more headlands located immediately within the boundary polygon;
d) in respect of each obstacle polygon, defining one or more headlands surrounding the obstacle polygon;
e) defining a work area that corresponds to the area within the boundary polygon with the exclusion of the area corresponding to any headlands and with the exclusion of the area corresponding to any obstacle polygon;
f) in respect of the orientation of one or more sides of headlands, define an array of parallel working rows located within the work area;
g) in respect of one or more arrays of parallel working rows defined in step f), define an array of possible continuous driving paths by connecting separate entities, wherein the separate entities is being either headlands, or parts of a headland, and working rows, or parts of a working row; so as to define possible continuous driving paths, wherein each driving path is covering all headlands and all working rows;
h) in respect of each of more possible continuous driving paths defined in step g), calculate an associated cost parameter, the calculated cost parameter being representative of the efficiency by following that specific continuous driving path;
i) select as the trajectory to be followed, that specific continuous driving path exhibiting the highest efficiency.

Item 10: A support system (100) according to item 9, wherein the trajectory calculating unit is being configured to create a possible continuous path by first choosing a particular entrance/exit gate.

Item 11: A support system (100) according to item 9 or 10, wherein in respect of one or more of the obstacle polygons, the headland surrounding the obstacle polygon includes a safety offset area surrounding the obstacle polygon.

Item 12: A support system (100) according to any of the items 9-11, wherein each of the working row and/or each of the headland independently are having a width corresponding to the effective working width of the work vehicle or working implement.

Item 13: A support system (100) according to any of the items 9-12, wherein the support system being configured for defining a number of possible continues driven paths, each comprising a sequence of straight line segments and arched line segments.

Item 14: A support system (100) according to any of the preceding items, wherein the support system is being configured to find the optimized trajectory by means of a heuristic method, such as a greedy heuristic method, a tabu search solver, an ant colony solver, a genetic algorithm.

Item 15: A support system (100) according to any of the items 8-14, wherein the support system is being configured to create a number N of possible continuous driven paths with an associated assigned cost parameter, and wherein the number N being an integer in the range 1,000-700,000 or more, for example, 2,000-600,000, such as 5,000-500,000, e.g., 10,000-400,000, such as 50,000-300,000 or 100,000-200,000 possible continuous driven paths with an associated assigned cost parameter.

Item 16: A method for determining a trajectory to be followed by an agricultural work vehicle, when working a field, the method comprising the steps:
a) providing information relating to:
i) coordinates relating to the boundaries of a field to be worked; and
ii) coordinates relating to the boundaries of one or more obstacles to be avoided by the work vehicle; wherein the one or more obstacles being located within the field;
b) providing information relating to:
one or more capacity parameters relating to the working vehicle;
c) performing a calculation of an optimized trajectory to be followed by the work vehicle; wherein the optimized trajectory is being calculated on the basis of the coordinates provided in steps a) and b).

Item 17: A method according to claim 16, wherein step a) furthermore is involves providing
iii) coordinates relating to the possible entrance/exit gates of the field.

Item 18: A method according to item 16 or 17, wherein the optimized trajectory is an optimized trajectory in terms of total operational time for working the field; total productive time for working the field; total fuel consumption for working the field; total non-working distance for working the field; total distance travelled twice or more; total distance travelled through crops; total area covered twice or more, Item 19: A method according to any of the items 16-18, wherein the one or more capacity parameters being selected from the group comprises: effective working width of the work vehicle or the working implement, load of work vehicle as a function of distance travelled, fuel consumption as a function of distance travelled, and minimum turning radius of vehicle or implement or both.

Item 20: A method according to any of the items 16-19, wherein the optimized trajectory to be followed by the work vehicle is being presented in a graphical presentation such as being showed on an electronic map of the field to be worked.

Item 21: A method according to any of the items 16-20 involving calculation of the optimized trajectory analytically or numerically.

Item 22: A method according to any of the items 16-21, the method involves finding a number of candidate trajectories; calculation in respect of each candidate trajectory, an efficiency parameter; and suggesting to a user, that specific candidate trajectory, which exhibits the highest efficiency parameter.

Item 23: A method according to any of the items 16-22, wherein the method involves performing the following steps:
  a) approximating the coordinates relating to the boundaries of the field to be worked to a boundary polygon;
  b) approximating the coordinates relating to the boundaries of each of the one or more obstacles, to respective obstacle polygons;
  c) defining one or more headlands located immediately within the boundary polygon;
  d) in respect of each obstacle polygon, defining one or more headlands surrounding the obstacle polygon;
  e) defining a work area that corresponds to the area within the boundary polygon with the exclusion of the area corresponding to any headlands and with the exclusion of the area corresponding to any obstacle polygon;
  f) in respect of the orientation of one or more sides of headlands, define an array of parallel working rows located within the work area;
  g) in respect of one or more arrays of parallel working rows defined in step f), define an array of possible continuous driving paths by connecting separate entities, wherein the separate entities is being either headlands, or parts of a headland, and working rows, or parts of a working row; so as to define possible continuous driving paths wherein each driving path is covering all headlands and all working rows;
  h) in respect of each of more possible continuous driving paths defined in step g), calculate an associated cost parameter, the calculated cost parameter being representative of the efficiency by following that specific continuous driving path;
  i) select as the trajectory to be followed, that specific continuous driving path exhibiting the highest efficiency.

Item 24: A method according to item 23, wherein the method involves creation of a possible continuous path by first choosing a particular entrance/exit gate.

Item 25: A method according to item 23 or 24, wherein in respect of one or more of the obstacle polygons, the headland surrounding the obstacle polygon includes a safety offset area surrounding the obstacle polygon.

Item 26: A method according to any of the item 23-25, wherein each working row and/or each headland independently are having a width corresponding to the effective working width of the work vehicle or working implement.

Item 27: A method according to any of the item 23-26, wherein the method involves defining a number of possible continuous driven paths, each comprising a sequence of straight line segments and arched line segments.

Item 28: A method according to any of the items 16-27, wherein the method involves finding the optimized trajectory by means of a heuristic method, such as a greedy heuristic method, a tabu search solver, an ant colony solver, a genetic algorithm.

Item 29: A method according to any of the items 21-28, wherein the method involves creating a number N of possible continuous driven paths with an associated assigned cost parameter, and wherein the number N being an integer in the range 1,000-700,000, for example, 2,000-600,000, such as 5,000-500,000, e.g., 10,000-400,000, such as 50,000-300,000 or 100,000-200,000 possible continuous driven paths with an associated assigned cost parameter, possible continuous driven paths with an associated assigned cost parameter.

Item 30: A method according to any of the preceding items, wherein the method being performed by using a support system according to any of the items 1-15.

Item 31: A computer program product that, when loaded or operating on a computer, is adapted to perform the method according to any of the items 16-29.

Item 32: An agricultural work vehicle comprising a support system according to any of the items 1-15.

Item 33: Use of a support system according to any of the items 1-15 or of a computer program product according to item 31 or of an agricultural work vehicle according to item 32 for optimizing a trajectory to be followed by the work vehicle when working a field.

Item 34: Use according to item 33, wherein the working a field relates to mechanical working of the soil, such as plowing, harrowing, tilling; sowing; weeding, fertilizing, harvesting.

LIST OF REFERENCE NUMERALS

2 Boundary of crop field
4 Entrance/exit gate
8 Obstacle within crop field
10 Boundary polygon
12 Obstacle polygon
14,14' Headland
16 Work area
18, 18' Outer periphery of headland
20,20' Inner periphery of headland
24 Work row within work area
28 Possible continuous driving path for working a field
100 Support system
500 Agricultural field
A,B Entrance/exit gate
D,C,E Obstacle in agricultural field
G Working implement
11,12 Information
13,14 Information
MU Mapping unit
CU Capacity parameter unit
TCU Trajectory calculating unit
M Display/monitor

The invention claimed is:

1. A support system for determining a trajectory to be followed by an agricultural work vehicle, when working a field, the system comprises:
  a mapping unit including at least one processor configured to enable the mapping unit to receive:
    i) coordinates relating to boundaries of a field to be worked; and
    ii) coordinates relating to boundaries of one or more obstacles to be avoided by the work vehicle; wherein the one or more obstacles are located within the field;
  a capacity parameter unit including the at least one processor configured to enable the capacity parameter unit to receive one or more capacity parameters relating to the work vehicle;
  a trajectory calculating unit including the at least one processor configured to enable the trajectory calculating unit to calculate an optimized trajectory to be followed by the work vehicle; wherein the optimized trajectory is calculated on a basis of the coordinates received by the mapping unit; and one or more of the one or more capacity parameters received by the capacity parameter unit;

wherein the support system is configured to find the optimized trajectory by a heuristic method comprising at least one of a greedy heuristic method, a tabu search solver, an ant colony solver, or a genetic algorithm; and wherein the trajectory calculating unit is configured to perform the following acts:
 a) approximating the coordinates relating to the boundaries of the field to be worked to a boundary polygon; and wherein the support system is configured to determine the trajectory to be followed, based on that approximation;
 b) approximating the coordinates relating to the boundaries of each of the one or more obstacles, to respective obstacle polygons; and wherein the support system is configured to determine the trajectory to be followed, based on that approximation;
 c) defining one or more headlands located immediately within the boundary polygon;
 d) in respect of each obstacle polygon, defining one or more headlands surrounding the obstacle polygon;
 e) defining a work area that corresponds to an area within the boundary polygon with exclusion of an area corresponding to any headlands and with exclusion of an area corresponding to any obstacle polygon;
 f) in respect of orientation of one or more sides of headlands, define an array of parallel working rows located within the work area;
 g) in respect of one or more arrays of parallel working rows defined in act f), define an array of possible continuous driving paths by connecting separate entities, wherein the separate entities is either headlands, or parts of a headland, and working rows, or parts of a working row; so as to define possible continuous driving paths, wherein each driving path is covering all headlands and all working rows;
 h) in respect of each of more possible continuous driving paths defined in act g), calculate an associated cost parameter, the calculated cost parameter being representative of efficiency by following that specific continuous driving path; and
 i) select as the trajectory to be followed, that specific continuous driving path exhibiting the highest efficiency.

2. The support system according to claim 1, wherein the mapping unit is further configured for receiving:
 iii) coordinates relating to possible entrance gates and/or exit gates of the field.

3. The support system according to claim 1, wherein the optimized trajectory is an optimized trajectory in terms of at least one of: total operational time for working the field, total productive time for working the field, total fuel consumption for working the field, total non-working distance for working the field, total distance travelled at least twice, total distance travelled through crops, or total area covered at least twice.

4. The support system according to claim 1, wherein the one or more capacity parameters are selected from the group comprising:
 effective working width of the work vehicle or the working implement;
 load of work vehicle as a function of distance travelled;
 fuel consumption as a function of distance travelled; or
 minimum turning radius of vehicle or implement, or both.

5. The support system according to claim 1, wherein the mapping unit is configured for storing, in respect of one or more specific fields, one or more of:
 i) coordinates relating to boundaries of the one or more specific fields;
 ii) coordinates relating to the boundaries of one or more obstacles being located within the one or more specific fields; or
 iii) coordinates relating to possible entrance gates and/or exit gates of the one or more specific fields.

6. The support system according to claim 1, wherein the trajectory calculating unit is configured to find a number of candidate trajectories, wherein the trajectory calculating unit is configured to calculate, in respect of each candidate trajectory, an efficiency parameter, and wherein the trajectory calculating unit is configured to suggest to a user that specific candidate trajectory that exhibits the highest efficiency parameter.

7. The support system according to claim 1, wherein in respect of one or more of the obstacle polygons, a headland of the one or more headlands surrounding the obstacle polygon includes a safety offset area surrounding the obstacle polygon.

8. The support system according to claim 1, wherein each working row of the array of parallel working rows and/or each headland of the one or more headlands independently has a width corresponding to an effective working width of the work vehicle or working implement.

9. The support system according to claim 1, wherein the support system is configured for defining a number of possible continuous driven paths, each comprising a sequence of straight line segments and arched line segments.

10. A method for determining a trajectory to be followed by an agricultural work vehicle, when working a field, the method comprising:
 A) providing information relating to:
  i) coordinates relating to boundaries of a field to be worked; and
  ii) coordinates relating to boundaries of one or more obstacles to be avoided by the work vehicle; wherein the one or more obstacles are located within the field;
 B) providing information relating to:
  one or more capacity parameters relating to the work vehicle;
 C) performing a calculation of an optimized trajectory to be followed by the work vehicle; and
 D) finding the optimized trajectory by a heuristic method comprising at least one of a greedy heuristic method, a tabu search solver, an ant colony solver, or a genetic algorithm;

wherein the optimized trajectory is calculated on the basis of the coordinates provided in act A); and wherein the method involves performing the following acts:
 a) approximating the coordinates relating to the boundaries of the field to be worked to a boundary polygon;
 b) approximating the coordinates relating to the boundaries of each of the one or more obstacles, to respective obstacle polygons;
 c) defining one or more headlands located immediately within the boundary polygon;
 d) in respect of each obstacle polygon, defining one or more headlands surrounding the obstacle polygon;
 e) defining a work area that corresponds to an area within the boundary polygon with exclusion of an area corresponding to any headlands and with exclusion of an area corresponding to any obstacle polygon;

f) in respect of orientation of one or more sides of headlands, define an array of parallel working rows located within the work area;

g) in respect of one or more arrays of parallel working rows defined in act f), define an array of possible continuous driving paths by connecting separate entities, wherein the separate entities is either headlands, or parts of a headland, and working rows, or parts of a working row; so as to define possible continuous driving paths wherein each driving path is covering all headlands and all working rows;

h) in respect of each of more possible continuous driving paths defined in act g), calculate an associated cost parameter, the calculated cost parameter being representative of efficiency by following that specific continuous driving path; and i) select as the trajectory to be followed, that specific continuous driving path exhibiting the highest efficiency.

11. A non-transitory computer readable medium having a computer program product, which, when loaded or operating on a computer, is configured to perform the method according to claim 10.

12. The method according to claim 10, wherein act A) further involves providing:
   iii) coordinates relating to possible entrance gates and/or exit gates of the field.

13. The method according to claim 10, wherein the optimized trajectory is an optimized trajectory in terms of total operational time for working the field, total productive time for working the field, total fuel consumption for working the field, total non-working distance for working the field, total distance travelled at least twice, total distance travelled through crops, and total area covered at least twice.

14. The method according to claim 10, wherein the one or more capacity parameters is selected from the group comprising:
   effective working width of the work vehicle or the working implement;
   load of work vehicle as a function of distance travelled;
   fuel consumption as a function of distance travelled; or
   minimum turning radius of vehicle or implement, or both.

15. The method according to claim 10, further comprising:
   finding a number of candidate trajectories;
   calculating, in respect of each candidate trajectory, an efficiency parameter; and
   suggesting to a user a specific candidate trajectory that exhibits the highest efficiency parameter.

16. The method according to claim 10, wherein, in respect of one or more of the obstacle polygons, a headland surrounding the obstacle polygon includes a safety offset area surrounding the obstacle polygon.

17. The method according to claim 10, wherein each working row of the array of parallel working rows and/or each headland of the one or more headlands independently has a width corresponding to an effective working width of the work vehicle or working implement.

18. The method according to claim 10, further comprising defining a number of possible continuous driven paths, each comprising a sequence of straight line segments and arched line segments.

19. The method according to claim 10, wherein the method is performed by using a support system according to claim 1.

\* \* \* \* \*

UNITED STATES PATENT AND TRADEMARK OFFICE
CERTIFICATE OF CORRECTION

PATENT NO. : 11,185,006 B2  
APPLICATION NO. : 16/338119  
DATED : November 30, 2021  
INVENTOR(S) : Ole Green and Gareth Thomas Charles Edwards Page 1 of 1

It is certified that error appears in the above-identified patent and that said Letters Patent is hereby corrected as shown below:

In the Specification

Column 13, Lines 33, 34, change "Since 01 and 02" to --Since O1 and O2--  
Column 13, Line 42, change "$P_i$ and $P_1$" to --$P_i$ and $P_j$--  
Column 14, Line 2, change "$_\square^1 P'$ and $_\square^1 P'$" to --$_\square^1 P'$ and $_\square^2 P'$--  
Column 14, Line 4, change "$\{,P'_p\}, _\square^1 P'$" to --$\{,P'_p\}, _\square^2 P'$--  
Column 14, Line 7, change "$\{,P'_p\}, _\square^1 P'$" to --$\{,P'_p\}, _\square^2 P'$--

Signed and Sealed this  
Eighteenth Day of January, 2022

Drew Hirshfeld  
*Performing the Functions and Duties of the*  
*Under Secretary of Commerce for Intellectual Property and*  
*Director of the United States Patent and Trademark Office*